United States Patent
Kobayashi et al.

(10) Patent No.: US 6,817,740 B2
(45) Date of Patent: Nov. 16, 2004

(54) VEHICLE HEADLAMP APPARATUS

(75) Inventors: Shoji Kobayashi, Shizuoka (JP);
Motohiro Komatsu, Shizuoka (JP);
Hidetada Sugiyama, Shizuoka (JP);
Takeshi Masuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/006,360

(22) Filed: Dec. 6, 2001

(65) Prior Publication Data
US 2002/0080618 A1 Jun. 27, 2002

(30) Foreign Application Priority Data
Dec. 27, 2000 (JP) ...................................... P. 2000-397327

(51) Int. Cl.$^7$ .............................. B60Q 1/06; B60Q 1/08
(52) U.S. Cl. .................... 362/466; 362/276; 362/467
(58) Field of Search ................................ 362/466, 464, 362/465, 276, 36, 37, 467, 71; 340/988

(56) References Cited

U.S. PATENT DOCUMENTS

| | | | | |
|---|---|---|---|---|
| 5,562,336 A | * | 10/1996 | Gotou | ........................ 362/466 |
| 5,588,733 A | | 12/1996 | Gotou | |
| 5,837,994 A | * | 11/1998 | Stam et al. | ............... 250/208.1 |
| 5,931,572 A | * | 8/1999 | Gotoh | ......................... 362/466 |
| 6,049,749 A | | 4/2000 | Kobayashi | |
| 6,254,259 B1 | | 7/2001 | Kobayashi | |
| 6,459,387 B1 | * | 10/2002 | Kobayashi et al. | ......... 340/988 |

FOREIGN PATENT DOCUMENTS

GB 2 355 869 A 2/2001

* cited by examiner

Primary Examiner—Alan Cariaso
Assistant Examiner—Mark Tsidulko
(74) Attorney, Agent, or Firm—Fish & Richardson P.C.

(57) ABSTRACT

In a vehicle headlamp apparatus 1, there are provided a map information acquiring means 2 for acquiring positional information on one's own vehicle on a map and the environmental information, and an environmental condition detection means 3 for detecting an environmental condition relating to a traveling road on which one's own vehicle is driven according image information or the information acquired from a radar. The light distribution control means 4 of a lighting device 5 performs light distribution control over the headlamp according to more reliable one of both kinds of information adopted with the priority given thereto out of the information derived from the map information acquiring means 2 and the information detected by the environmental condition detection means 3 or according to the information complemented with both kinds of information described above.

13 Claims, 14 Drawing Sheets

VEHICLE HEADLAMP APPARATUS

BACKGROUND OF THE INVENTION

The present invention relates to an art to properly control lighting from a vehicle headlamp while taking into consideration traveling road and environmental conditions.

The Intelligent Transport System (ITS) calls for solving technical problems about warning vehicle drivers of dangers, making them evade dangers, automated driving and so forth; for example, it is regarded as being important to establish the art of recognizing environments around vehicles such as obstacles on roads and recognizing traveling roads, and enhancing its reliability.

There is a known apparatus for controlling light distribution by varying the direction of emission of light from a lighting device and an irradiation range in response to variations in the travel condition of a vehicle and the traveling road. However, it is still preferred to control light distribution on precisely securing information concerning traveling roads and the ambient environment with the sufficient intensity of illumination in the forward field of vision and reducing the influence of dazzling light on oncoming vehicles, road users and so forth as much as possible.

In order to acquire data on the configuration of a road on which one's own vehicle is driven, the following apparatus can be referred to.

An image processing system for extracting lane marks and the like on the basis of image information from an on-vehicle camera in order to recognize an intersection, a specific position on the road surface, the curvature radius of the linear form of a road and so forth.

A system for acquiring the present position of one's own vehicle and the environmental information based on map information from a navigation apparatus for use in guiding a route and the like.

However, the conventional apparatus still develop problems in the following respects.

In the first method using the on-vehicle camera, though recognizing capability can satisfactorily be demonstrated and though distance measurement precision is relatively high in case where a good visual field is assured in the daytime, the luminance of a lane mark as an object to be detected tends to become lowered as the distance from the vehicle increases, for example, in case where a sufficient quantity of lighting is unavailable during night traveling and the problem is that the lane detection capability is lowered. Moreover, inconvenience is caused by the fact that there recognition performance is affected by the weather condition. For example, there are problems arising from a decrease in luminance contrast that is caused by scattering originating from an optical screen phenomenon due to rainy weather and fog, a decrease in lane recognition performance originating from a surface reflection phenomenon due to a water on the road, infeasibility of lane mark detection on the snow and so forth.

In the second method using the navigation apparatus, as map matching precision regarding the present position of one's own vehicle lowers in case where the vehicle is driven on a road having few changes of direction for hours or where the vehicle is driven in a road between tall buildings in the urban area, in the mountainous area or the like, it becomes hardly possible to accurately make a decision on a curved road and the position of an intersection that are necessary for controlling lighting. Moreover, there is the fear of making lighting control entirely improper to the condition of the road on which the vehicle is being driven in case where a wrong route is taken.

In a road map schematically shown in FIG. 16, for example, a thick line shows a national highway a, and a road b running in substantially parallel thereto shows a prefectural highway. Further, a route R shown by a broken line therein shows an actually selected route and a route R' shown by a chain double-dashed line shows a route predicted by the navigation apparatus.

In case where there exists a road (the national highway) extending in parallel and close to a road (the prefectural highway) on which the vehicle is being driven, the probability for mistaking the national highway as a high-grade road for the route is high, which may result in making lighting control improper to the actual state of a road to be taken.

SUMMARY OF THE INVENTION

An object of the present invention is to exert proper, highly reliable lighting control in harmony with travel environment in which a vehicle is driven.

In order to solve the foregoing problems, a vehicle headlamp apparatus according to the invention comprises: map information acquiring means for acquiring positional information on one's own vehicle on a map and the environmental information, environmental condition detection means for detecting an environmental condition relating to a traveling road on which one's own vehicle is driven according image information or the information acquired from a radar, and light distribution control means for varying the light distribution of a headlamp attached to a vehicle in accordance with variation with the travel condition of one's own vehicle and the environmental condition, wherein the light distribution control means performs light distribution control over the headlamp according to one of both kinds of information adopted with the priority given thereto out of the information derived from the map information acquiring means and the information detected by the environmental condition detection means or according to the information complemented with both kinds of information above.

Therefore, according to the invention, the priority is given to more reliable information out of the information derived from the map information acquiring means and the information detected by the environmental condition detection means so as to perform light distribution control over a lighting device or to perform light distribution control over the lighting device according to the modified information complemented with the difference between both kinds of information, so that forward irradiation light on the traveling road of the vehicle is satisfactorily secured by using highly reliable detected information and that travel safety is enhanced.

DETAILED DESCRIPTION OF THE PREFERRED EMBODIMENTS

Figure 1:
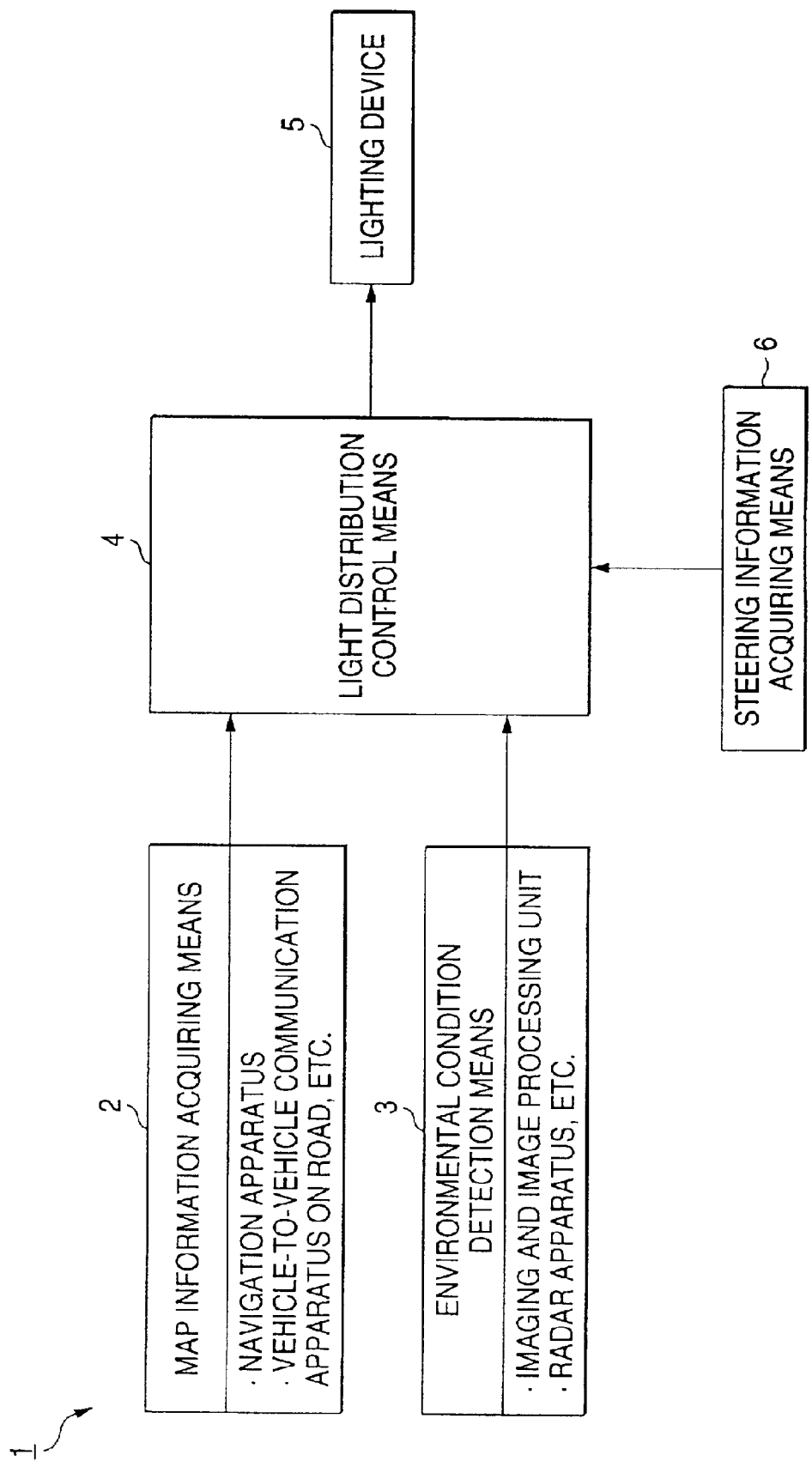
FIG. 1 is a block diagram showing the basic configuration of the present invention.

Before a specific apparatus configuration according to the invention is described, the essential component elements of a vehicle headlamp apparatus 1 will be described first by reference to FIG. 1.

The vehicle headlamp apparatus 1 comprises map information acquiring means 2, environmental condition detection means 3, light distribution control means 4, and a light device 5.

Although the lighting device 5 refers to a headlamp in the narrow sense in the case of a vehicle headlamp, it is not limited to a single lamp but may include an apparatus constituted of auxiliary lighting devices such as a fog lamp, a cornering lamp and so forth.

A map information acquiring means 2 would be required to acquire information about the position of one's own vehicle on a map as well as environmental information, the information concerned being sent to a light distribution control means 4. The map information acquiring means 2 may include the following equipment.

(a) GPS (Global Positioning System): a navigation apparatus utilizing radio waves from a satellite.

(b) Road-to-vehicle communication apparatus.

First, the apparatus of (a) is adapted to display the present position of one's own vehicle on a road map based on the signal detected by a gyrosensor and a vehicle speed sensor, the radio information received by a GPS receiver from the GPS satellite, the map information recorded on recording media (DVD-ROM and the like) and so forth and to carry out route guidance along a planned route up to an intended spot. Further, the apparatus of (b) is so arranged as to acquire information concerning the present position of one's own vehicle on the road surface as well as the road configuration (including the road gradient and the curvature radius) based on the information received from communicating poles between the vehicle and the road. The communicating poles are installed on the median strips and side road belts of highways at predetermined intervals (the communicable distance) and the main corners and intersections in urban areas where obstacles in view of relaying communications as well as mountainous roads.

As long as these apparatus are concerned, one or both of them may be used.

Out of various kinds of information received from the information acquired, the positional information and the environmental information are necessary for the control of light distribution of the headlamp and following data, for example, are referred to.

(I) Positional information:

Present position of one's own vehicle.

Predicted position of the one's own vehicle after traveling for a predetermined time.

Although the predicted position above is easy to know from the product of vehicle speed 'V' and a predetermined travel time 'Δt' in case where the vehicle is driven straight ahead, in case where changes in route take place, the distance predicted a predetermined time later (driving distance until brake force works) needs obtaining in consideration of speed including the altered direction and the curvature radius 'R' (proportional to a square of the speed and inversely proportional to the sum of a gradient on one side and a side slip frictional coefficient).

(II) Environmental information:

Travel area, difference in area.

Road linear data (not the road configuration itself but linear data by extracting the characteristics of the configuration.

Positions of road structures such as intersections and tunnels and the distance from one's own vehicle.

Number of lanes and width of the lane at the intersection of the traveling road.

Kind of traveling road.

As the map information acquiring means 2 assumes that one's own vehicle is driven on a road on the map, this is not different in any way from having an imaginary vehicle driven in an imaginary space called a map in a sense there is no guarantee that the one's own vehicle is actually running on the road in case where map matching is not precisely carried out.

On the other hand, the environmental condition detection means 3 is needed to gather actual information on the environmental condition relating the road on which the vehicle is driven and these pieces of information are detected according to image information or information acquired by a radar before being sent to the light distribution control means 4. Apparatus for use include the following, for example.

Imaging unit (on-vehicle camera).

Radar apparats (laser radar, ultrasonic radar, etc.).

With respect to the imaging unit, first, an image sensor such as a CCD type and a CMOS type that employ a solid imaging element and a camera including an optical system may be used. Moreover, there are a method of using one imaging unit and a method of using more than one imaging unit; while on the one side the advantage of the latter case is that image processing can be performed with stereophonic images and a stereoscopic view, there still exists a disadvantage in securing mounting precision, cost reduction, installation space and so forth.

In any way, what is needed to control light distribution of the lighting device out of the information acquired from the image data detected by the imaging unit includes the following:

Presence or absence of a stationary and a mobile object and the existing positions and configurations of them, Number of lanes.

Curvature radius of the road.

Distance up to an intersection and a curved road.

Position of the traffic lane of the traveling road.

Road surface condition (dry, wet, covered with water etc.).

Weather condition (rain, fog, snow, etc., according to the analysis of luminance of the road surface).

Travel area (resulting from the detection of luminance of the road surface, the intensity of environmental illumination, etc.).

Presence or absence of the mobile object such as a preceding and an oncoming vehicle and its estimated position.

Traffic amount and the environmental luminance.

Imaging objects in the forward field of vision may be enumerated as follows:

Center line and the median strip.

Road shoulder line.

Road structures such as signals and dazzling-preventive fences.

Subjects that utilize the road such as a preceding and an oncoming vehicle, and a pedestrian.

Various detection points necessary for controlling light distribution (e.g., the detection position set over the luminous intensity of distribution in response to vehicle speed).

With respect to the wavelength range used in the imaging unit, there are an ultraviolet and an infrared zone in addition to a visible light zone. In other words, when a visible light type camera is employed, recognizing performance close to the naked eyes of the driver is obtained and it is anticipated that the contrast is improved by using high luminance lane marks, vehicle light sources and the like. When ultraviolet light is used, on the other hand, a headlamp capable of emitting rays of the ultraviolet zone is used though a camera of the visible light type is acceptable as image formation utilizing the fluorescent phenomenon of the lane mark produced by the emission of light therefrom is needed. When infrared light is used, further, a special camera having sensitivity of the infrared zone (such as near infrared rays) is used (as an ordinary headlamp emits infrared light, any special lighting device is not needed to be newly installed) and image formation is carried out by utilizing the reflected light. In addition, an image sensor in a millimeter wave-length band may be mentioned and such an image sensor is effective in acquiring information in bad weather.

As candidate lane mark detection means, there are a visibility light type CCD camera, a near infrared solid imaging element, an infrared camera and so forth. In case where the contrast of a video signal obtained with a road surface image including that of a lane mark being formed is sufficiently height, the lane detection is relatively easily made; for example, the traveling road configuration is obtainable by presuming the line shape after the white line is detected. With respect to the optical detection means, however, care must be used in that the anticipated recognizing performance is lowered in such a situation that the contrast of the luminance of an object to be detected and its background is insufficient; for example, the weather condition is worsened and the intensity of environmental illumination is reduced.

The laser radar and the ultrasonic radar are used to gather information around a vehicle by means of detected waves. Of the information detected by these radars, there are the following items as necessary for controlling light distribution of the lighting device.

Presence or absence of a stationary and a mobile object and the existing positions of them.

Vehicle-to-vehicle distance to a preceding vehicle and relative position therebetween.

Position of an oncoming vehicle and the distance to the vehicle.

The advantage in particular is that information concerning the existing positions of and the relative distance between the preceding and oncoming vehicles and the relative speed therebetween can be acquired.

With respect to the radar apparatus, it is possible to not only make measuring items satisfactory but also improve the measuring precision by using the radar apparatus in combination with the imaging unit rather than using it independently. For example, though the recognition of the traveling road where the vehicle is driven lacks reliability with only a radar, precise recognition of the travel area and the travel environment can be made possible by utilizing both of them in combination and further the map information acquiring means 2.

The light distribution control means 4 is needed to vary the light distribution of the headlamp attached to the vehicle according to variation in the travel and environmental conditions of one's own vehicle. With respect to irradiation control, the luminous intensity distribution is made controllable by varying the direction of irradiation, irradiation range, starting time of control, control speed and the like according to the environmental conditions of the vehicle.

With respect to the control of the direction of irradiation, there are a method of directing irradiation light totally in a predetermined direction and a method of directing irradiation light partially in a predetermined direction. For example, there are a method of directing the irradiation axis of the lighting device in a predetermined direction by pivoting the whole lighting device around its pivotal shaft and a method of directing the optical axis of an optical system totally in a predetermined direction by controlling the postures of component members of the lighting device (e.g., the reflective mirror, lens, light source, shading member and so forth). In order to change the irradiation light partially, moreover, there are a method of varying the irradiation axis of a specific lighting device in an apparatus comprising a plurality of lighting devices (e.g., in case where a headlamp, a fog lamp and a corner lamp are provided in an automobile, the irradiation axis of only one lamp or irradiation axes of two lamps out of three lamps are varies) and a method of controlling the posture of one member or the postures of a plurality of members out of component members of a lighting device (e.g., by forming the reflective mirror with a fixed reflective mirror and a movable reflective mirror, the optical axis of the movable reflective mirror is directed in a desired direction).

With respect to the control of the irradiation range, there are a method of combining irradiation ranges using a plurality of lighting devices and a method of varying the irradiation range by moving part of the component portion of a lighting device. In an apparatus for forming the whole irradiation range by combining the irradiation ranges using the plurality of lighting devices, for example, there are a method of providing two lighting devices different in the irradiation range as a method of controlling the irradiation ranges of some lighting devices so that while the irradiation range of one lighting device is fixed, the irradiation range of the other is varied (e.g., the irradiation range is expanded laterally) and so forth. Further, there is a method of coordinating the relative positional relation between two lenses so as to freely control the degree of diffusion of irradiation light by driving the lenses as a method of varying the irradiation range of a lighting device by varying the posture of one or those of several component members of the lighting device, for example, as a method of utilizing the movements of the lenses. Moreover, the irradiation range of the lighting device may be varied by moving a shade for shading part of light from a light source. In addition, adoption of any other mode for carrying out the invention is possible on the basis of a combination of optical component members of a lighting device by moving only a light source or moving a reflective mirror and a light source, a lens and a reflective mirror or a lens and a shade together so as the vary an irradiation range.

With respect to the control for widening or narrowing the irradiation range, it is preferred to vary the irradiation range in response to the vehicle speed and acceleration. This is because the extent of the visual field of a driver differs between high-speed and low-speed traveling or between constant speed and sharp speed reduction and consequently the irradiation range is preferably set wider during the low-speed travelling, the sharp speed reduction and the like than in any other travel condition.

As far as the invention is concerned, the process of effecting the irradiation control is simplified so that the irradiation control may directly be performed by means of the control signal sent from the light distribution control means 4 to the headlamp (or a driving means necessary for the control of irradiation from the lighting device 5 may be considered inclusive in the light distribution control means 4) as specific contents of light distribution control are not in question (one of the examples of them will be described below).

The information acquired by the map information acquiring means 2 and what is detected by the environmental condition detection means 3 are sent to and processed by the light distribution control means 4 but these pieces of information are not always accurate. In case where the precision of the map matching is low, the reliability of the information acquired by the map information acquiring means 2 is lowered. When the imaging unit (including an image Processing unit) is employed as the environmental condition detection means 3, for example, there is the fear that information with lower reliability and improper information may be gathered without satisfactory recognizing performance due to insufficiency of illuminance resulting from a dense fog, a heavy rain, a snowfall and the like toward the far road surface at night.

According to the invention, it provides a basis whether the light distribution control over the headlamp is based on the information adopted with priority given to one of these pieces of information or on the reliable information complemented by using both pieces of information.

When lane detection is carried out by using the imaging unit about the road on which one's own vehicle is being driven, it is only needed to control the light distribution of the headlamp by manually or automatically switching between the information acquired by the map information acquiring means 2 or the information detected by the environmental condition detection means 3 depending on the quality of the detected result (urging the driver to do switching by issuing a warning). In other words, the information acquired by the map information acquiring means 2 is adopted when the light distribution control means 4 decides that the recognizing performance of the environmental condition detection means 3 becomes lowered or impossible because the weather condition worsens or the luminance of the road surface becomes insufficient.

When the light distribution control means 4 decides that the accuracy of the map information acquiring means 2 lowers and the acquisition of the information becomes impossible, on the contrary, the information acquired by the environmental condition detection means 3 is adopted.

Needless to say, the discrepancy between the contents of information acquired by both means above may happen because of their lowered functions. At this time, the detected information obtained by complementing the information on the other side with the information on one side is preferably processed so that the detected information matches the information that has been gathered until the present time. For example, in case where there is recognized a difference between the information acquired by the map information acquiring means 2 and what is acquired by the environmental condition detection means 3, the information acquired by the former should be modified according to the information acquired by the latter. According to this embodiment of the invention, however, the reliability of the actual travel condition is relatively highly evaluated in this case and it is therefore set as a premise that the result recognized by the environmental condition detection means 3 can sufficiently be relied upon (e.g., bad weather is in nonexistent; the intensity of forward illumination is sufficient; and no problem has been posed about the recognizing performance). Referring the lane detection by way of example, the contrast can be obtained from the video signal gained by the imaging unit and the quantity defined by '(VL−VR)/VR' where VL=video output voltage corresponding to the luminance of the lane mark and VR=video output voltage corresponding to the luminance of the surrounding road surface is calculated. Then the calculated quantity is compared with the threshold value and when the contrast is proved high, the result of lane detection is considered reliable.

In case where the capability of the imaging unit for detecting the lane mark is low, it is preferred for the light distribution control means 2 to control the light distribution of the headlamp base on the informed acquired by the map information acquiring means 2 but as the image contrast of the forward road surface tens to be easily affected by the weather condition, the light distribution may be controlled by adopting the information from the map information acquiring means 2 while the information detected by the environmental condition detection means 3 is disregarded when the worsening of the weather condition is detected. With respect to detecting whether the worsening of the weather condition occurs, it can totally be determined by acquiring various kinds of information using, for example, a temperature-humidity sensor, an atmospheric pressure sensor, an illumination sensor and so forth other than information on the lowering of the image contrast, by acquiring information on the operation of a wiper (on-off reciprocating time of a switch) and by acquiring weather information through road-to-vehicle communications.

It is also needed to take measures to counter cases where the functions of both the map information acquiring means 2 and the environmental condition detection means 3 are lowered and where both of functions become incapable of recognition and there are the following methods, for example.

A method of providing a means for detecting a steering angle so as to control irradiation according to the detected result.

A method of controlling irradiation by utilizing information from an automatic steering gear.

As the means for detecting the steering angle, there is a steering angle sensor (or steering sensor) for acquiring data concerning the steering condition of the driver, whereby a decision is made on whether the vehicle is driven on a curved road or a straightly road according to the detected signal, for example. In case where the vehicle is driven on the curved road, the turning radius of the vehicle is obtained according the detected signal of the steering angle and the light distribution of the headlamp for irradiating the predicted forward road surface position in the direction of travel (mainly the direction of irradiation) of the vehicle may be controlled.

The automatic steering gear is an apparatus installed in an automatic driving system, a yawing preventive system and so forth and used for automatizing and supporting driving. As a predicted value concerning the travel direction of a vehicle is obtained from this gear, light distribution control for irradiating the forward road surface is made possible beforehand.

A steering information acquiring means 6 that has put these detection means and apparatus together is shown in FIG. 1 and the information obtainable by this means is sent to the light distribution control means 4.

According to the invention, the information acquired by the map information acquiring means 2 and what is acquired by the environmental condition detection means 3 are collated with each other and processed inclusively, whereby the light distribution control over the lighting device can be performed according to information more reliable than before as a result of considering the matching of both pieces of information.

Figure 16:
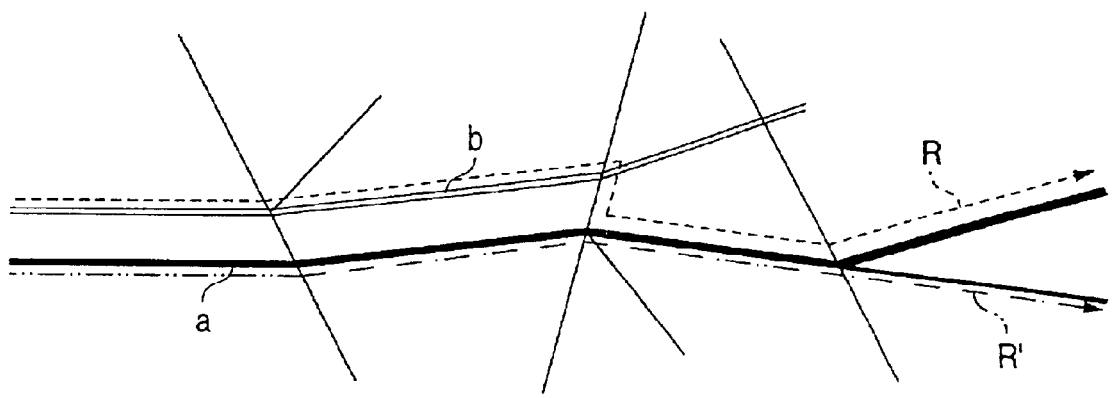
FIG. 16 is a diagram explanatory of problems heretofore raised.

In the example shown in FIG. 16, for example, the information acquired by the map information acquiring means 2 concerning the environmental conditions of one's own vehicle and the information acquired by the environmental condition detection means 3 at a node where roads cross each other are compared. In case where both pieces of information do not coincide with each other, it is possible to modify the predicted route of one's own vehicle because there is found a difference between the predicted route and the actually selected route of one's own vehicle. With the process like this, the predicted and actually selected routes can be made to coincide with each other as much as possible. However, this applies to the case where the pieces of information acquired by both means are highly reliable and in case where it is proved that the function of one of the means is lowered, the light distribution is controlled while the information acquired by the other means is respected. Thus, harmful effects originating from controlling light distribution by blindly believing in improper information can be prevented.

FIGS. 2 to 15 show a vehicle headlamp apparatus embodying the present invention.

Figure 2:
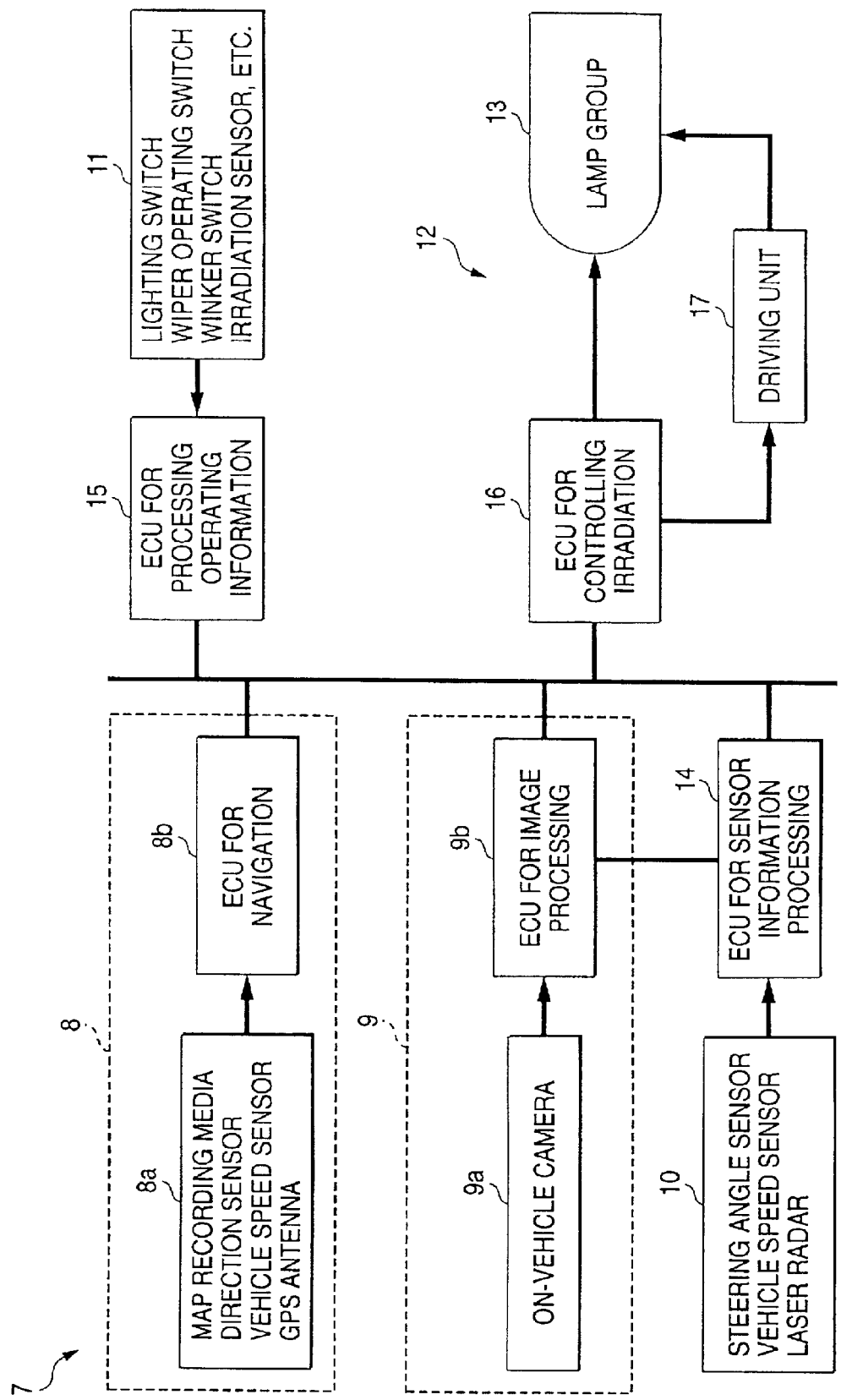
FIG. 2 is a diagram showing an apparatus configuration that explains an embodiment of the invention together with FIGS. 3 to 15.

FIG. 2 is a block diagram showing the configuration of a vehicle headlamp apparatus 7 by way of example, including the following units.

The vehicle headlamp apparatus comprises navigation apparatus 8, imaging unit 9, sensor unit 10, operating unit 11, lamp control unit 12, a lamp group 13, and various ECUs.

The navigation apparatus 8 has a basic information gathering unit 8a including a direction sensor, a vehicle speed sensor, a GPS antenna, recording media (CD-ROM, DVD-ROM and so forth) for providing map information and driving equipment, and an ECU (Electronic Control Unit) 8b, these being equivalent to the above-described map information acquiring means 2. As is well known, this apparatus has a setting means for setting the present position and a setting means for setting a traveling road for route guidance and is capable of outputting various road data concerning the number of lanes of the traveling road, width of the lane, road lineality and the like or the distance from one's own vehicle up to an intersection or a tunnel, the position of an intersection of the traveling road, the number of lanes (seen from the positions of links and the number of links), width of the lane and the like.

The imaging unit 9 has an on-vehicle camera (small CCD camera) 9a and an image processing ECU 9a for detecting lanes and the like by processing the image signal picked up thereby.

The sensor unit 10 essentially consists of a sensor group, for example, the following sensors.

Laser radar.

Vehicle speed sensor.

Steering angle sensor (such as a steering sensor and a yaw rate sensor).

The information detected by these sensors is sent to an ECU 14 (a sensor information processing ECU), whereby these pieces of information are collectively processed. Moreover, the ECU 14 exchanges information directly with an image processing ECU 9b. According to this embodiment of the invention, the imaging unit 9 and a laser radar are simultaneously used to constitute the environmental condition detection means 3.

The operating unit 11 is mainly intended to acquire operating information and includes the following switches, for example.

Lamp on-off switch.

Wiper operating switch.

Direction indicator operating switch.

In addition the operating unit 11 also includes an illumination sensor for detecting the brightness around the vehicle, an ambient temperature-humidity sensor, a time measuring device for acquiring date and time information, information as to the operating of theses switches is sent to and processed by an ECU 15 (ECU for processing operating information and the like).

The lamp control unit 12 controls on-off of a lamp group 13 including a left and a right headlamp installed in the front portion of the vehicle, a dimmering and an emitting operation (control over the direction and range of irradiation) by using an irradiation controlling ECU 16 and a driving unit 17. In this case, ECUs each containing computers are arranged so as to communicate with each other for information through a vehicle LAN (Local Area Network) and these ECUs are used to form the light distribution control means 4.

FIGS. 3 to 7 show the construction of a headlamp by way of example.

Figure 3:
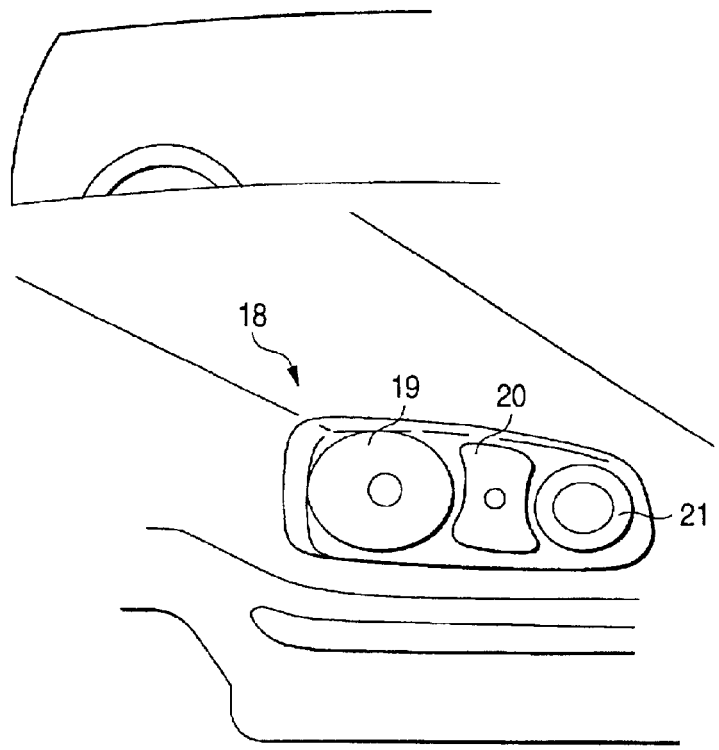
FIG. 3 is a schematic diagram showing the exemplary external construction of an headlamp.

FIG. 3 shows one headlamp apparatus 18 out of the lighting devices each installed on the right and left sides of the front portion of a vehicle, the headlamp apparatus being formed with three lamps (reference numerals are shown in parentheses).

Main lamp (19) with a vertical leveling function.

Lamp (20) for irradiation near the vehicle.

Lamp (21) for supporting the function.

Figure 4:
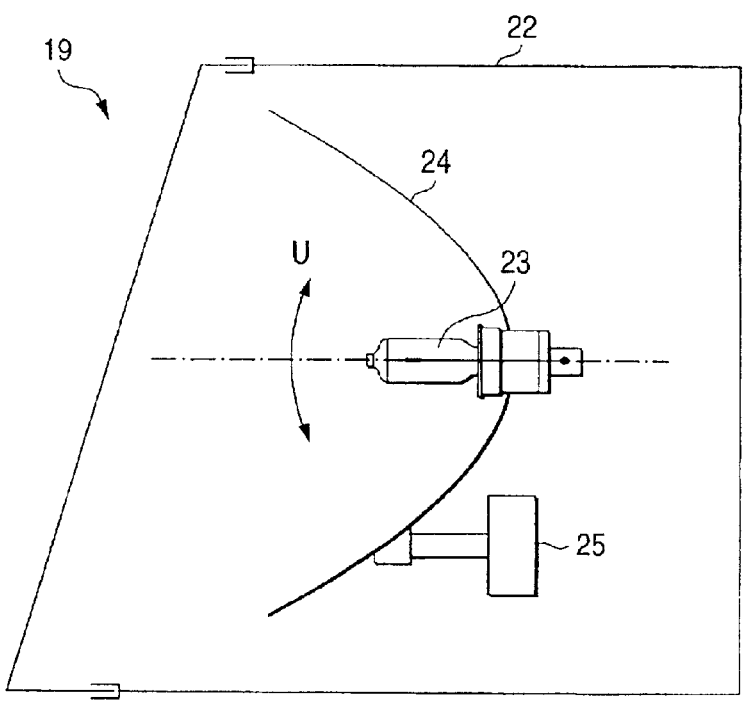
FIG. 4 is a schematic diagram explanatory of the exemplary construction of a lamp equipped with a leveling function.

The main lamp 19 with the vertical leveling function among the three lamps is positioned closest to the lateral end and contained a mechanism for varying the direction of irradiation of the lighting device within the vertical plane including the optical axis. As schematically shown in FIG. 4, for example, a light source 23 and a reflective mirror 24 are provided in a lamp body 22 prepared for use common to the three lamps and the reflective mirror 24 is driven by an leveling actuator 25 to change the tilted posture whereby to vary the optical axis (see a chain line) of the reflective mirror in the direction shown by a double headed arrow U therein.

Moreover, the lamp 20 for irradiation near the vehicle is positioned in the middle of the three lamps and a fixed lamp for mainly irradiating a short-distance area (on this side area) ahead of the vehicle.

The lamp 21 for supporting the function is provided for supporting the function of the main lamp 19 with the vertical leveling function and there are two lamps as follows:

Lamp with a driving mechanism in the lateral direction.
Lamp capable of emitting near infrared rays.

Figure 5:
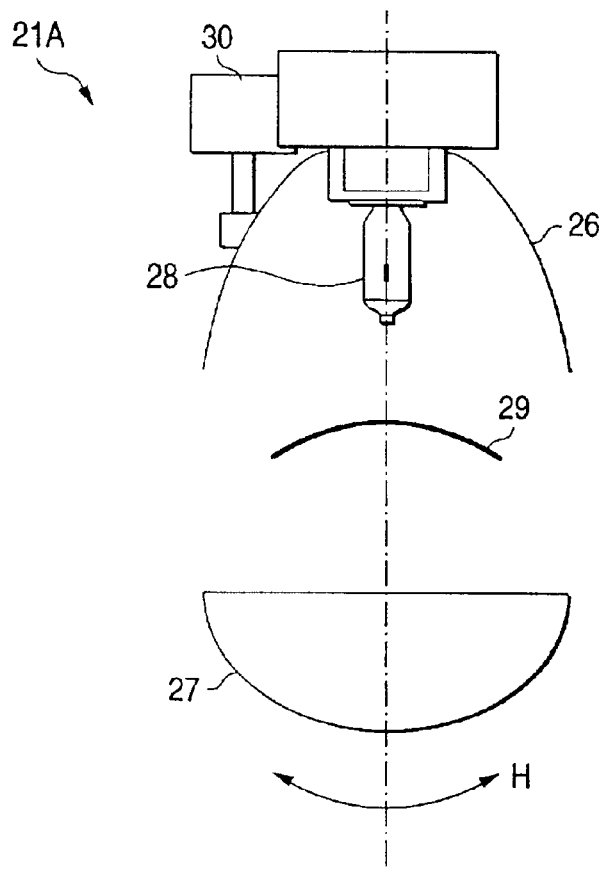
FIG. 5 is a schematic diagram explanatory of the exemplary construction of a lamp equipped with an optical-axis driving mechanism in the lateral direction.

FIG. 5 shows a projector type lamp having an elliptic reflective mirror 26, a projecting lens 27, a light source 28 and shade 29 as an exemplary arrangement 21A of a lamp capable of irradiation control in the horizontal direction. More specifically, the light emitted from the light source 28 is reflected from the surface of the reflective mirror 26 and then the light that is not shaded by the shade 29 is irradiated forward via the projection lens 27. However, as a driving actuator 30 for varying the posture of the reflective mirror 26 in the lateral direction is provided, the optical axis of the reflective mirror 26 can be directed in a desired direction within the horizontal plane under the driving control over the actuator as shown by a double headed arrow H of FIG. 4.

Figure 6:
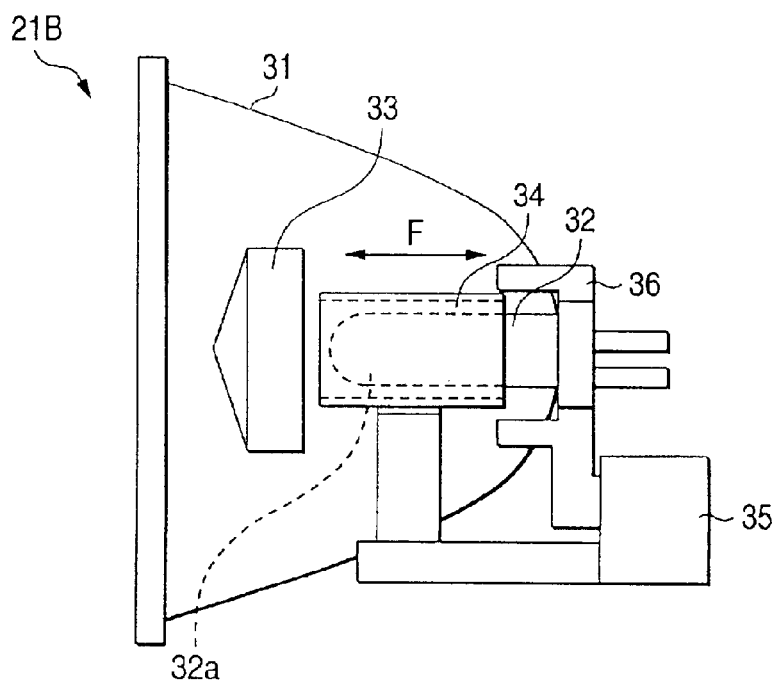
FIG. 6 is a schematic diagram showing the exemplary construction of a lamp capable of emitting an infrared ray.

Further, FIG. 6 shows an exemplary arrangement of a beam switching type lamp 21B so as to switch the emission of a near infrared ray and a travel beam (so-called a high beam). A shade 33 is provided in front of (in the direction of emission of light) the light emitting portion 32a of a light source 32 (e.g., an H7 type bulb or the like) mounted in a reflective mirror 31 and a glove 34 is disposed in a manner surrounding the light emitting portion 32a. Further, the glove 34 can be moved by its driving mechanism 35 along the direction of the optical axis of the reflective mirror 31 (see a double headed arrow F). As a multilayer film for transmitting the near infrared ray is formed on the glove 34, a ray in the near infrared zone is emitted with respect to the wavelength band of the light source 32 in such a state that the periphery of the light emitting portion 32a is substantially covered with the globe. A ray in the visible light zone is irradiated and the high beam is emitted forward by moving the glove 34 so as to nullify or decreasing a range of covering the periphery of the light emitting portion 32a. In this case, a metal heat-radiating intermediate member 36 is fitted round the base portion of the light source 32.

The actuators 25 and 30 and the driving mechanism 35 above are included in the driving unit 17.

Figure 7:
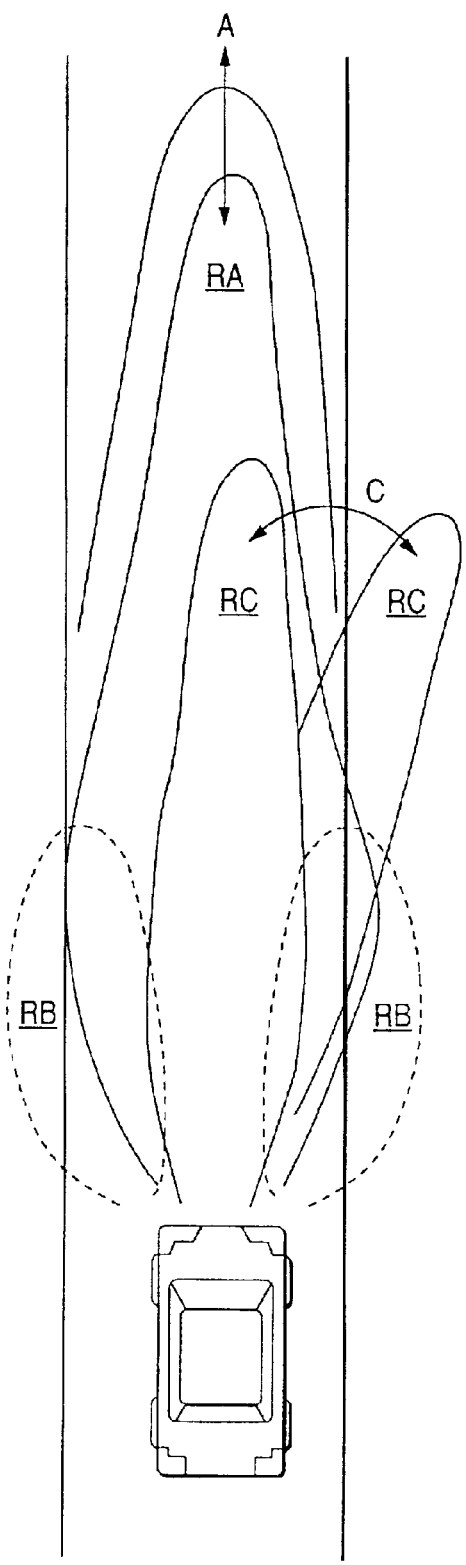
FIG. 7 is a diagram explanatory of the function and irradiation range of each lamp.

FIG. 7 schematically show the irradiation ranges of the respective lamps and the horizontally driven type lamp of FIG. 5 is employed as a function supporting lamp 21 according to this embodiment of the invention.

The range 'RA' refers to the irradiation range of the main lamp 19 with the vertical leveling function and as shown by a double headed arrow A, the irradiation distance in the longitudinal direction (in the direction of travel of the vehicle) can be varied by leveling control.

Further, the range 'RB' refers to the irradiation range of the lamp 20 for irradiation near the vehicle and is used to irradiate a short-distance area closer to the road shoulder.

The range 'RC' refers to the irradiation range of the lamp 21 for supporting the function and as shown by a double headed arrow C, for example, the direction of irradiation in the lateral direction can be varied by optical-axis driving control.

Consequently, the control of light distribution can be effected in harmony with the ambient environment by properly combining these lamps under the on-off control over them and driving control. At the time of high-speed traveling on a straight road, for example, a far visual field can be secured satisfactorily by extending the irradiation distance under the leveling control over the main lamp 19 with the vertical leveling function. Moreover, it is possible to turn on the lamp 20 for irradiation near the vehicle when the vehicle approaches an intersection or a Y-shaped road and to swing the optical axis by driving the lamp 21 for supporting the function during the travelling of a curved road so as to vary the irradiation direction laterally in accordance with the way the road is curved.

The lamp 21B capable of near infrared ray irradiation as shown in FIG. 6 is used for processing an image taken by the infrared camera and by forming an image with the infrared camera by throwing a ray excluding what is in the visible light zone from the light source 32, the sensitivity of detecting persons present ahead of the vehicle. Using light invisible to the human is advantageous in that road users such as pedestrians and drivers in oncoming vehicles are set free from feeling dazzling.

When the direction and range of irradiation of the lamp corresponding to the travel condition of the vehicle during traveling on the curved road and the intersection, the relation between the light distribution of the headlamp and the recognizing performance of the imaging unit 9 is needed to be made proper. In other words, as the recognizing distance of the lane mark and the like are varied with the kind of the headlamp, the difference in beam (the low and high beams), the difference in the light source for use and so forth, the targets of the lane detection distance and position should be determined in consideration of this point. In a lamp using a halogen bulb, for example, because a visually recognizing distance greatly differs between the time of the high-beam emission and that of the low-beam emission, there is the fear that no satisfactory result of recognition is available unless the detection distance and so forth are set in consideration of such a difference in beam.

It is preferred to determined a lane detection capability value (a condition value indicating the degree of detection capability and obtainable from the lane mark and the image contrast of the road surface, for example) in consideration of the fact that the capability is lowered in bad weather and to output the value. The capability value inclusive of a condition value indicating lane detection incapability and a condition value indicating that the lane detection is possible is output; with respect to the latter condition, a numerical value further indicating the maximum detection position of and the distance to the lane mark (i.e., the position of the farthest lane mark that is made recognizable by image processing and the distance up to the position).

Further, the lane detection capability value is compared with its target value (or a reference value) and the light distribution control is divided by selecting a beam control mode corresponding to the result of comparison.

The beam control mode includes the following modes.
Mode interlocked with camera.
Mode interlocked with navigation.
Mode interlocked with curved road detection.

First, the 'mode interlocked with a camera' means a control mode in which when the information derived from the imaging unit 9 is compared with what is derived from the navigation apparatus, the former information is regarded as important whereby to control the light distribution of the headlamp but when the precision and credibility of the information derived from the navigation apparatus 8 is completely lowered, that information is ignored.

The 'mode interlocked with navigation' means a control mode that is regarded as important whereby to control the light distribution of the headlamp but when the credibility (detection capability) of the information derived from the imaging unit 9 is completely lowered because of bad weather and the lowering of the intensity of illumination, that information is ignored.

The 'mode interlocked with curved road detection' is a control mode for controlling the light distribution so as to change the irradiation direction and angle of direction of the headlamp in conformity with the variation of the direction of travel of one's own vehicle when it is proved that the vehicle is being driven on a curved road according to the signal detected by the steering angle sensor.

Moreover, various control modes and the combination of them are needless to say possible: for example, a mode is created by combining the mode interlocked with the camera and the mode interlocked with the curved road detection, wherein as information concerning the results of decision on curved and straight roads, the angle of direction of the curved road, the turning radius of the curved road and so forth is available in addition to data on road linearity in such a state that the lane mark is detectable, the irradiation direction is controlled in accordance with variation in the road configuration by reference to these kinds of information and the information derived from the steering angle sensor.

In case where the lane detection through the image processing is impossible, it is arranges so that the mode interlocked with navigation or the mode interlocked with curved road detection may be selected and when the lane detection capability value exceeds the reference value, the mode interlocked with the camera is followed.

Even in case where the lane detection is possible and where the detection capability value is lower than the reference value, the accuracy of the present position of imaging unit obtainable from the navigation apparatus 8 is compared with a predetermined threshold value and when the position is less accurate, the mode interlocked with the camera or the mode interlocked with the curved road detection is selected and when the accuracy of the position is high, the mode interlocked with navigation is selected.

When only the decision of the direction of a lateral curved or a straight road is possible in the mode interlocked with the camera, an irradiation beam necessary for irradiation in that direction may be emitted or the irradiation beam in a beam-movable type lighting device may be directed in that direction. In case where even an angle of curved direction of a route can be decided, it is preferred to have the angle of beam irradiation followed in response to variation in the angle of direction.

Although information on the present position of the navigation apparatus 8 may be modified by reference to information on the lane detection derived from the imaging unit 9, the beam control mode is changed to the mode interlocked with the camera or the mode interlocked with the curved road detection as the direction of stretch of the road becomes different from the direction of travel of the vehicle when the vehicle yaws out of the lane or when it is in the middle of returning to the lane. Then the mode interlocked with navigation may preferably be followed on confirming that the accuracy of the present position of one's own vehicle is satisfactory after the vehicle returns to the lane.

Figure 8:
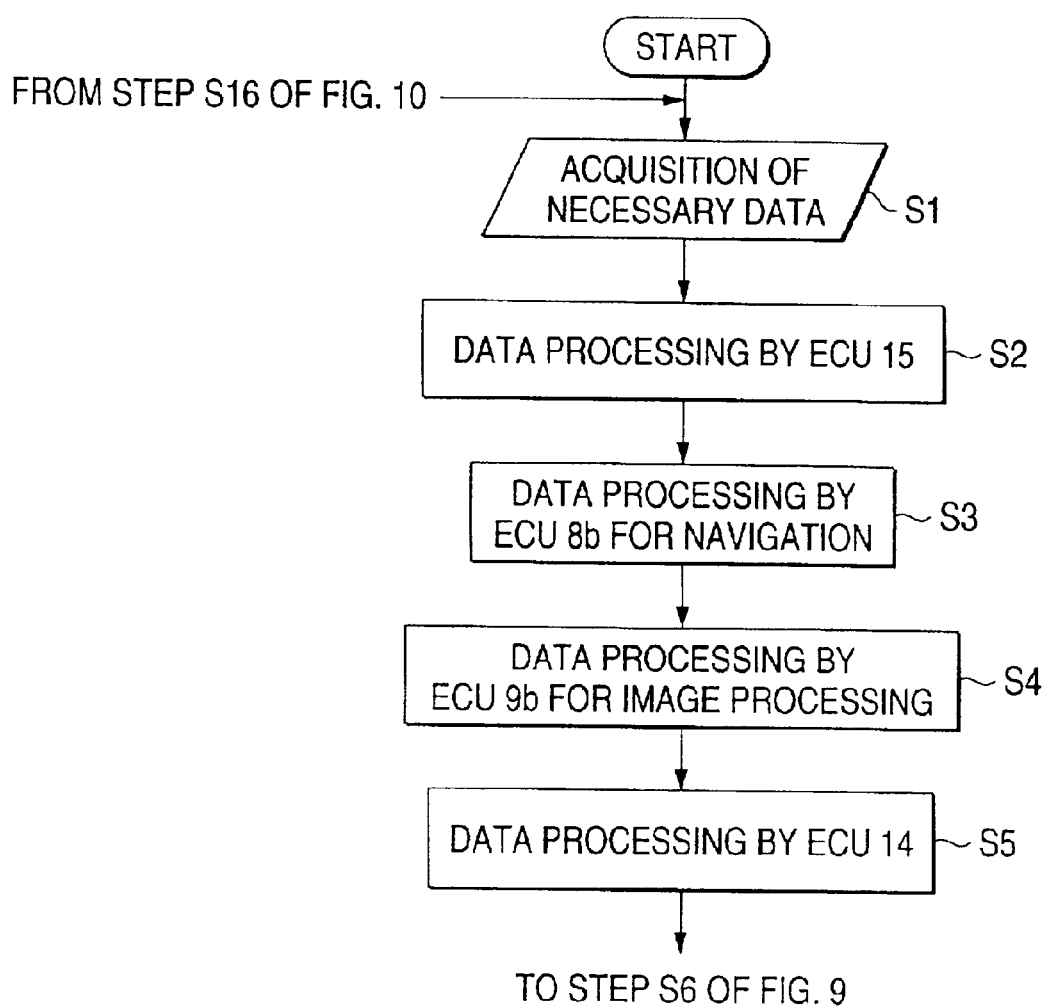
FIG. 8 is a flowchart explanatory of an example of control processing together with FIGS. 9 and 10, this figure showing a first processing phase.
Figure 9:
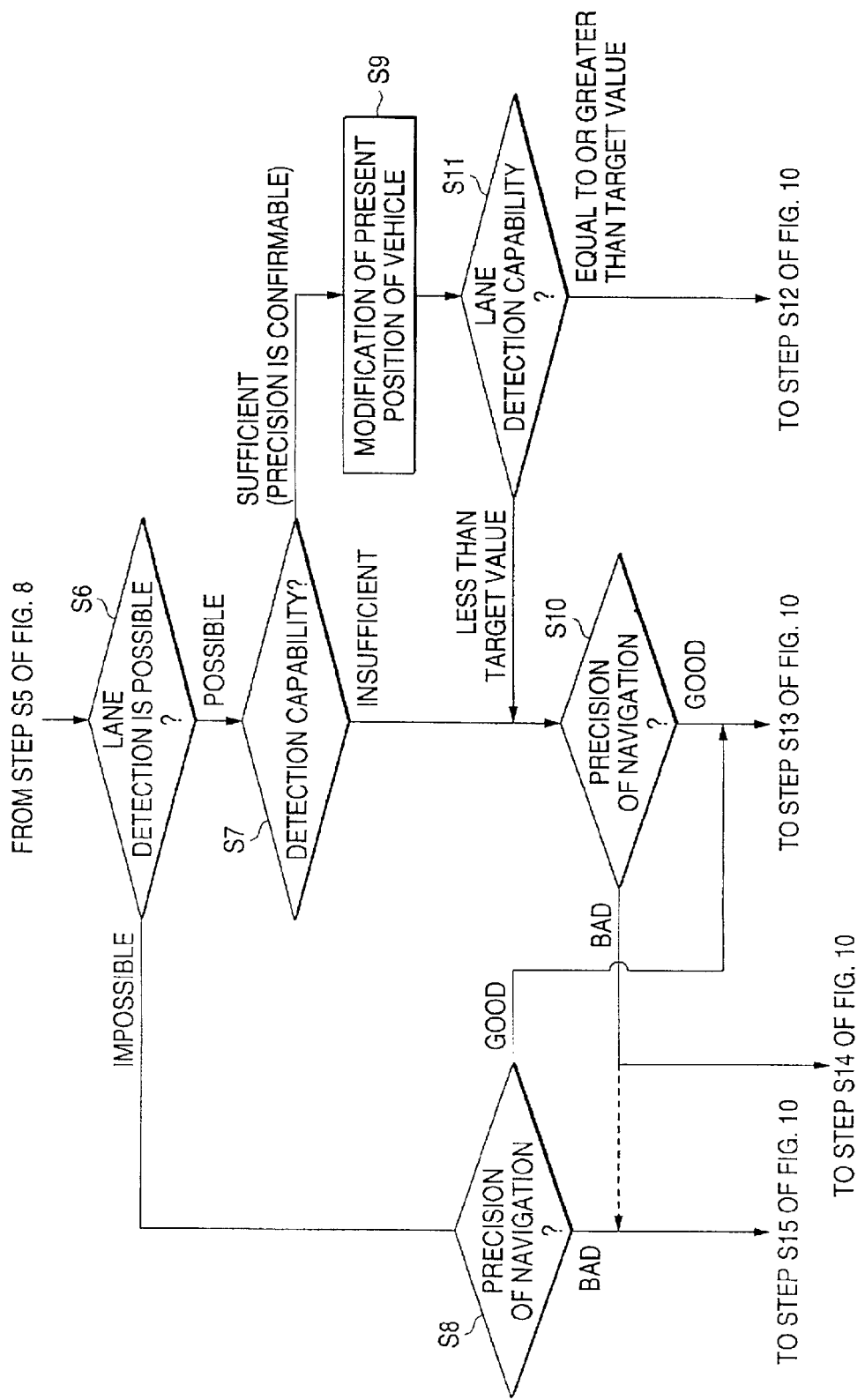
FIG. 9 is a flowchart in the middle processing phase.
Figure 10:
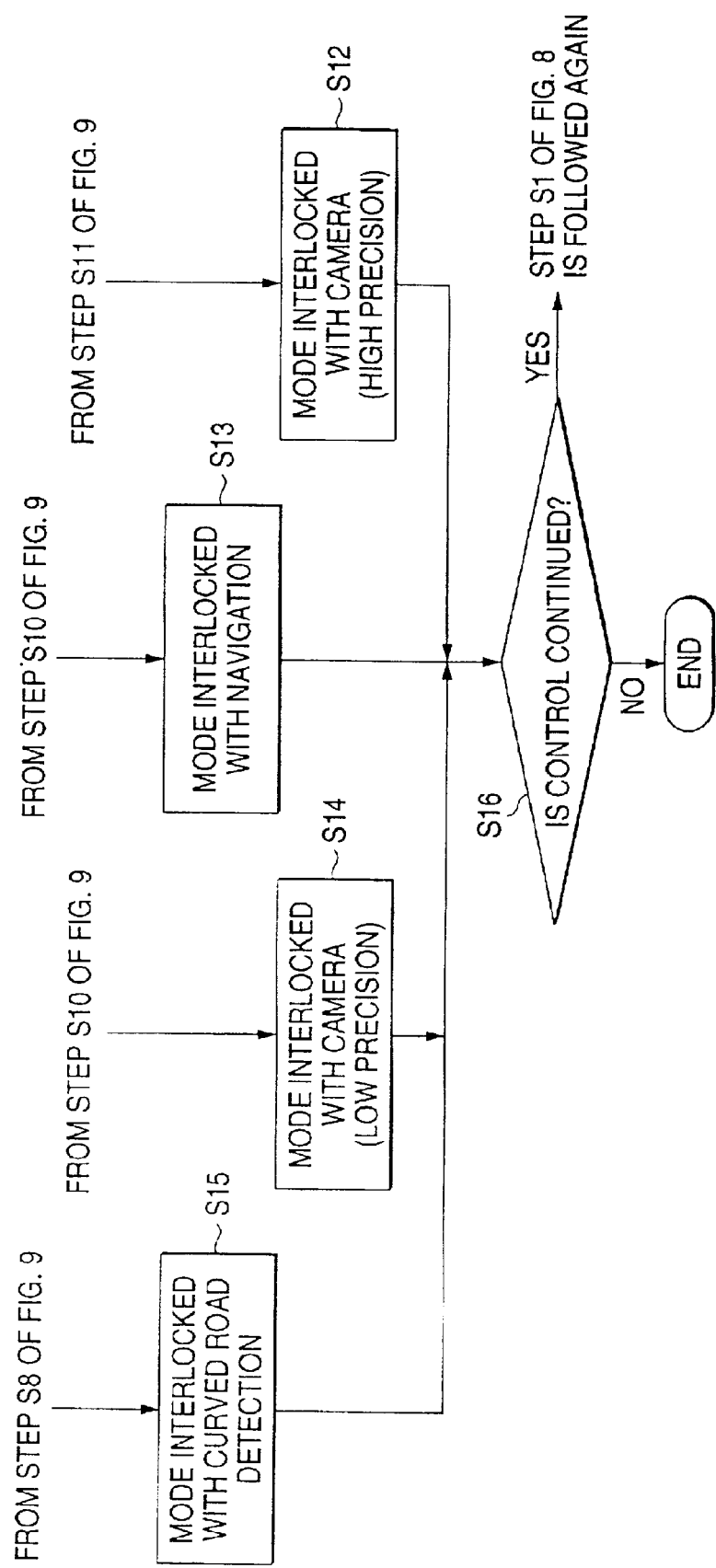
FIG. 10 is a flowchart in the final processing phase.

FIGS. 8 to 10 are flowcharts explanatory of exemplary control processing procedures.

At Step S1 of FIG. 8, information necessary for processing is acquired and gathered and then processed by each ECU, first. More specifically, roadmap information, directional information, vehicle speed information, GPS information and so forth are processed in the navigation ECU 8b. In the image processing ECU 9b, road image data from the imaging unit 9 is taken in to evaluate lane detection capability and in case where the lane detection is decided to be possible, the detected distance to a lane mark and road configuration data (linear data) and so forth are calculated.

The ECU 14 processes information as to the steering angle, vehicle speed and radar. The ECU 14 is originally intended for use in carrying out follow traveling with respect to a lane, automatic steering at a curved road, warning of yawing out of the lane and so forth, whereby the lane configuration of a traveling road, the road surface condition, information on the position of a preceding vehicle, data on the position of one's own vehicle within the lane of one's own vehicle, the steering condition of the driver and so forth can be obtained.

The ECU 15 processes information concerning the operation of various switches, temperature and humidity of the air, intensity of the environmental illumination and so forth.

Information necessary for processing and processing data in the ECUs can be transmitted and received directly via special communication lines or the vehicle LAN.

At Step S2, the ECU 15 performs presumed processing about the weather environment of the traveling road; for example, it judges the level of luminance contrast of the road surface image, and the weather conditions including the rain and the snowfall from wiper operating information and the air temperature.

At Step S3, the ECU 8b acquires information concerning the present position of one's own vehicle and the traveling road according to the information from the navigation apparatus 8 and calculates the position of the intersection, the curved road and so forth, the kinds of the travel area and data concerning the road configuration and further the predicted position of one's own vehicle after a predetermined travel time (e.g., the vehicle position presumed from a predicted distance until brake force works after the passage of 1.5, 2.5, 3.5 seconds, . . . ). In this case, setting of the present position of one's own vehicle, selection of the traveling road and so forth are carried out.

At Step S4, the contrast between the luminance of the lane mark and the road surface is analyzed in the ECU 9b and as a result of this, the wet-dry conditions of the road surface are presumed and the position of one's own vehicle in the lane of one's own vehicle, the presence or absence and the position of a preceding vehicle, the relative speed and so forth are calculated by reference to data on the weather condition obtained from the ECU 15.

At Step S5 that follows, the ECU 14 performs the process of comparing the result of calculation of the vehicle-to-vehicle distance between one's own vehicle and the preceding vehicle with a reference value corresponding to the vehicle speed, issuing a closeness warning and a warning when a decision is made on yawing out of the lane or the like. Further, the ECU 14 sets a lane detection target. The 'lane detection target' means a reference value for deciding whether the result of lane detection mark should be adopted as decision-making data. With respect to the reference value, there are a method of always make the reference value a constant value and a method of varying the reference value according to the weather condition, the intensity of environmental illumination and the like (e.g., making the reference value at the time of rain smaller than that in fine weather and making the reference value in the daytime smaller than that at night. In the latter case, the lane detection capability is made improvable by controlling the automatic lighting of the headlamp).

In case where the maximum detected distance to and the maximum detected position of the lane obtainable from the image processing ECU 9b do not reach the lane detection target and where the driver is driving the vehicle at a speed considerably exceeding the present appropriated vehicle speed, a warning is issued and an automatic travel mode (including follow traveling, prevention of yawing out of the line, automatic steering on the curved road and so forth) is switched to a manual travel mode. Moreover, the ECU 14 decides whether one's own vehicle is precisely tracing along the present route according to information from the steering angle sensor, the predicted vale of the position of one's own vehicle on the lane a predetermined time later, the angle of the direction of travel with respect to the direction of lane and so forth.

At Step S6 of FIG. 9, the ECU 9b decides the judgment made on the lane detection capability by means of image processing, that is, whether the lane detection is possible. In case where the lane detection is decided to be possible then, the next Step S7 is followed and otherwise, Step S8 is followed.

At Step S7, the ECU 9b compares the lane detection capability value with a reference value and in case where it exceeds the reference value, Step S9 is followed and otherwise, Step S10 is followed.

At Step S9, the ECUs 8b and 9b confirm that the result of lane detection can be collated with information from the navigation apparatus 8 and in case where the information (such as the present position of one's own vehicle and the like) is found to be problematical or wrong, the correction of the information is made by the ECU 8b and then Step S11 is followed.

At Step S11, the ECU 9b compares the lane detection capability with the lane detection target set at Step S5 and in case where the detection target is satisfactorily attained, Step S12 of FIG. 10 is followed and otherwise, Step S10 is followed.

At Step S10, the ECU 8b decides whether the matching precision in the navigation apparatus 8 is good or bad and in case where the precision is good, Step S13 of FIG. 10 is followed. In case where the precision is bad, Step S11 of FIG. 10 is followed (otherwise, Step S15 of FIG. 10 may be followed as shown by a broken line of FIG. 9.

At Step S8, the ECU 8b decides whether the matching precision in the navigation apparatus 8 is good or bad and in case where the precision is good, Step S13 of FIG. 10 is followed and otherwise, Step S15 of FIG. 10 is followed.

At Step S12 of FIG. 10, control in the mode interlocked with the camera (high precision) is performed. In other words, this step is reached in case where no problem exists in the lane detection capability, whereby, for example, emission from the headlamp corresponding to the road configuration is controlled according to the result of lane detection and the irradiation range is so controlled as to be widened in a place like an intersection where a certain visual field is needed. In this case, the setting of a position where the lane detection is made by the imaging unit 9 is based as a basic item on the distance in seeking a sufficient visually recognized distance regarding a lane mark on both right and left sides of the lane of one's own vehicle; however, the position may be sought from a visually recognized distance regarding a lane mark on one side within the lane of one's own vehicle. In the case of a straight or a leftward curve, the setting of the position is based on the distance that makes recognizable the leftside lane mark within the lane of one's own vehicle and in the case of a rightward curve, the setting of the position is based on the distance that makes recognizable the rightside lane mark within the lane of one's own vehicle.

In order to perform the control of the irradiation direction of the headlamp effectively, road configuration data is needed in a position preceded by a predetermined time corresponding to the vehicle speed (e.g., preceded by 1.5 to 3.5 seconds at 60 km/h). When the maximum detection distance to a lane mark is shorter than the distance up to the position, there occurs a case where the directivity of a curved road is made known but the curvature radius of the road is left unknown. Consequently, information concerning a place ahead of the present position of one's own vehicle is utilized as the information given by the navigation apparatus 8 and the correction of road configuration data to be made each time should preferably be based on the lane information acquired within the range of the maximum detection distance of the lane mark.

At Step S13, control in the mode interlocked with navigation is performed. More specifically, as the precision of the detected information through the image processing is unsatisfactory when this step is reached, the ECU 16 controls the irradiation direction and range of the headlamp according to various pieces of information derived from the navigation apparatus 8, including the configuration and kind of the road, the vehicle lane and so forth. However, the high precision of map matching is set forth as a premise in this case.

At Step S14, control in the mode interlocked with the camera is performed. More specifically, as the image processing detection capability is unsatisfactory and moreover the precision of the navigation apparatus 8 is bad, the irradiation direction and range of the headlamp are controlled within the range of detection capability of ECU 16 without placing too much confidence in the result of lane detection. For example, there is employed a method of not sharply varying the irradiation direction and range with the detected result but varying them little by little within the permissible range or delaying the control speed and responsiveness. Although lane mark detection become impossible on mountainous roads and streets in the urban area or places where no lane marks are displayed, a lane may be determined by detecting the boundary position between the road side belt as well as the road wall and the road surface.

At Step S15, control in the mode interlocked with curved road detection is performed. When a steering sensor is used, for example, as a steering direction and a steering angle regarding the handle operation of the driver can be detected, the direction of the curved road and the direction of the angle are calculated by the ECU 14 according to the information given by the sensor and the ECU 16 correspondingly controls the irradiation direction and range of the headlamp.

Step S16 after Steps S12 to S15 is followed and continuance of control is decided thereat. When control is continued, Step S1 of FIG. 8 is followed again. When the lighting switch of the headlamp is turned off, the headlamp is also turned off. However, it is preferably so arranged that the control is exerted continuously without interruption and when the lighting switch is turned on thereafter, each one of the control modes can immediately be activated. Therefore, the termination of control is decided when the whole apparatus is instructed to stop at Step S16.

A description will subsequently be given of irradiation control during travelling on the curved road and at the intersection by utilizing the information derived from the imaging unit and the laser radar.

With respect to the imaging unit, radar and so forth constituting the environmental condition detection means 3, there may occur conditions in which their detection capabilities are not fully demonstrated and it is preferred to arrange the apparatus itself such that whether its operating function is normal or not. As a capability value, for example, condition values indicating a detection capable condition and a detection incapable condition and in addition a value indicating the degree of detection capability regarding the detection capable condition should preferably be set ready to be output.

In case where the operating functions of the imaging unit 9 and the laser radar are normal, further, the road information and the like derived from the navigation apparatus 8 can be modified with these pieces of information as a basis.

With respect to the lane detection by the imaging unit 9, road partitioning and stop lines can be detected by processing image data on the forward road surface. Based on these data, it is possible to output various kinds of information including the number of traveling roads on which one's own vehicle is driven, the width of the vehicle lane, the linearity of the road, the distance from one's own vehicle to the intersection, the number of lanes on the road crossing the traveling road on which one's own vehicle is driven, the width of the vehicle lane and so forth.

With respect to the laser radar, information mainly on the positional relation between one's own vehicle and a vehicle ahead such as the presence or absence of the vehicle ahead, the distance between one's own vehicle and the vehicle ahead, the kind of the vehicle ahead (by distinguishing between a preceding vehicle or an oncoming vehicle) is output and road data indicating the number of lanes on the traveling road according to these kinds of information.

In view of the fact that processing is inefficient in that the sequential correction of road information to be made by the navigation apparatus according to the information acquired from the imaging unit and the laser radar imposes a burden on the processing performed by the ECU and that the process of confirming the lane configuration tends to become greater than the frequency of correction, comparison and collation of road information are preferably made at a specific place. For example, node positions indicating characters of the intersection (e.g., the intersection with a signal) carried as the road map data and of the road linearity are chosen.

Figure 11:
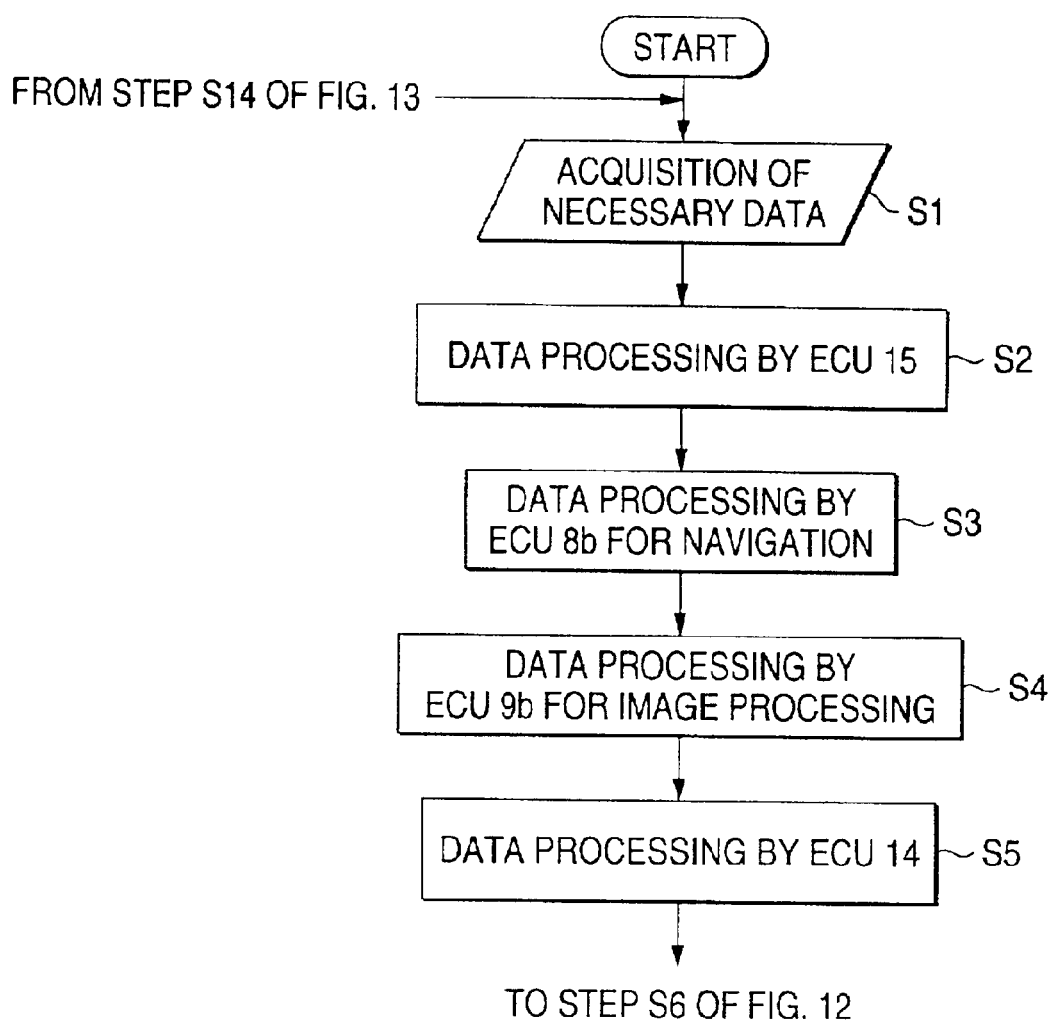
FIG. 11 is a flowchart showing an exemplary modification processing procedure concerning navigation data together with FIGS. 12 and 13, this figure showing a first processing phase.
Figure 12:
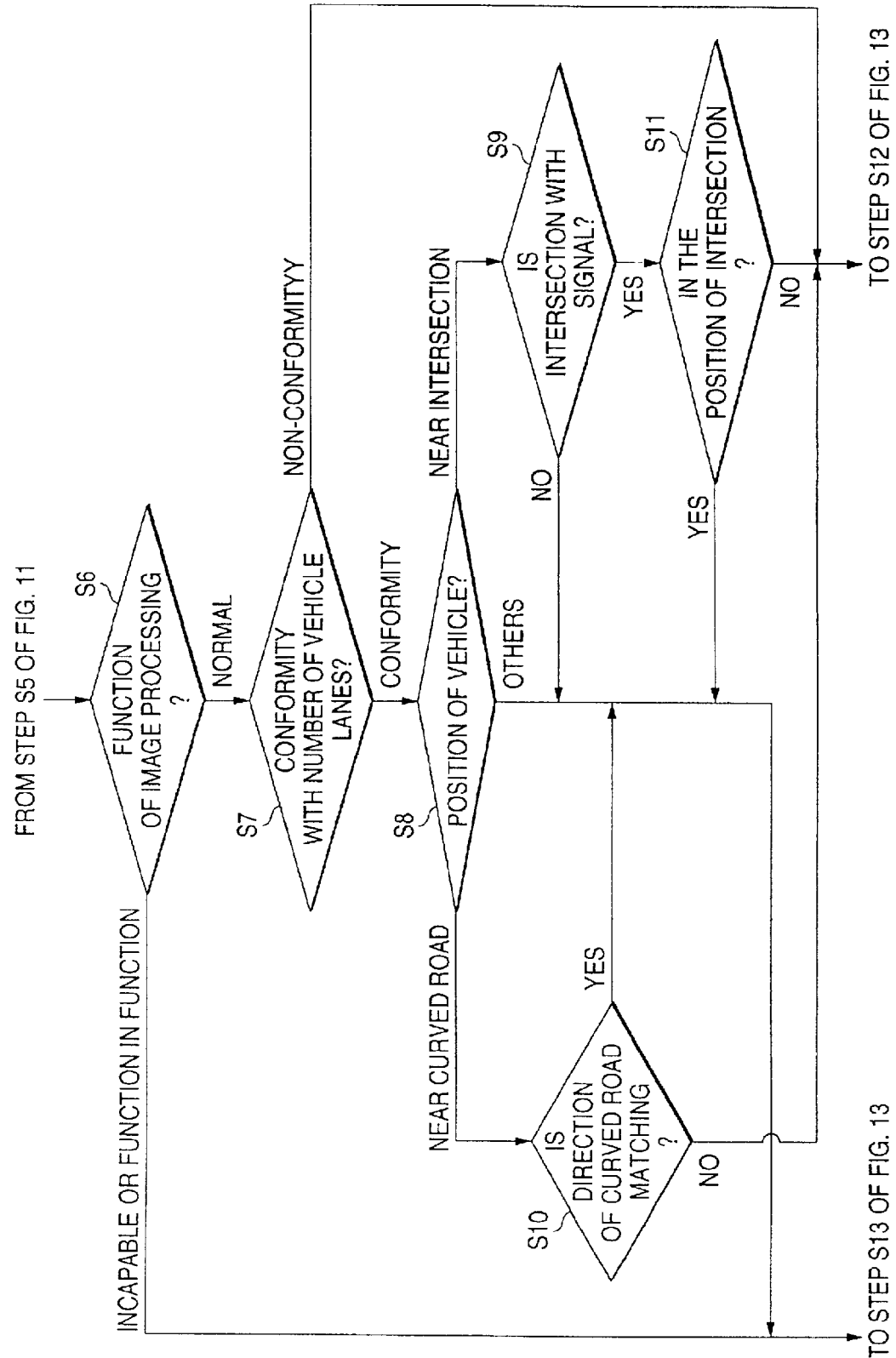
FIG. 12 is a flowchart in the middle processing phase.
Figure 13:
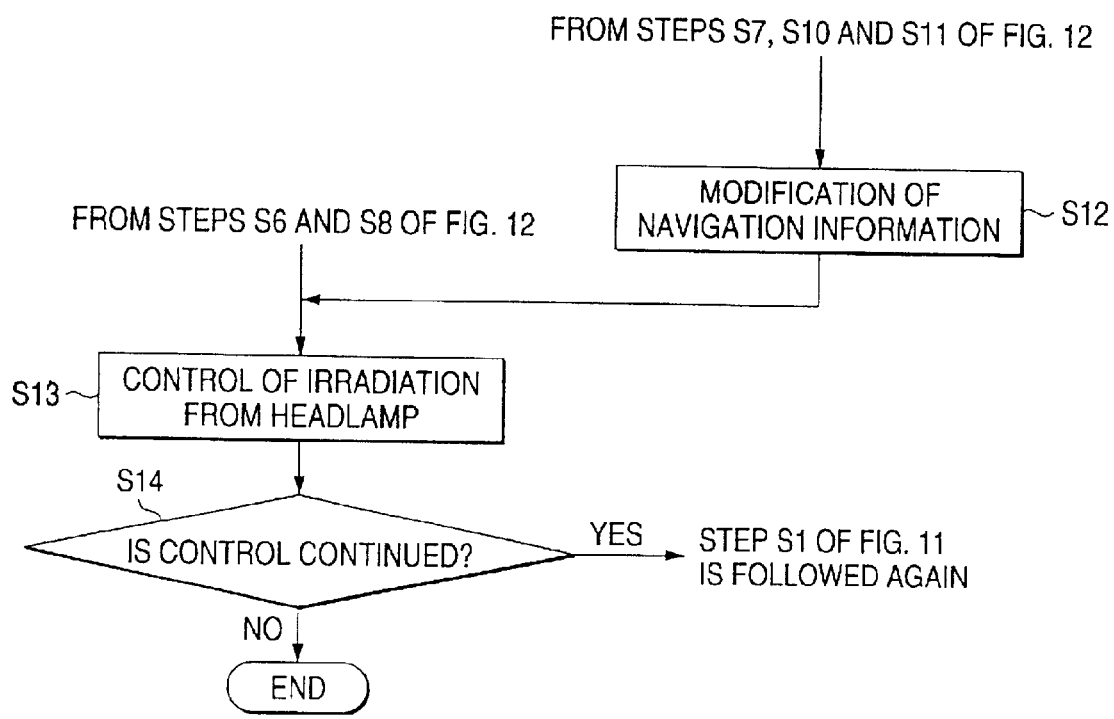
FIG. 13 is a flowchart in the final processing phase.

FIGS. 11 to 13 are flowcharts showing the processing of control by way of example. Incidentally, as the contents of Steps S1 to S5 are basically the same as those of processing at Steps S1 to S5 shown in FIG. 8, only differences are itemized as follow.

At Step S3, the degrees of precision and reliability (reliability ratio) of the navigation apparatus 8 are decided and processed.

At Step S4, information necessary for deciding and processing the operating function regarding the imaging unit 9 is acquired and as a result of image processing, road data including partitioning and stop lines, the number of lanes, the width of the vehicle lane, the position of the intersection, the position of the curved road are detected and in addition, the position and direction of the vehicle ahead and so forth are also detected.

At Step 55, the operating function is decided and processed regarding the laser radar and in addition to the detection of the vehicle-to-vehicle distance and direction with respect to the vehicle ahead, the number of lanes based on the condition of presence of a vehicle ahead is presumed.

At Step S6 of FIG. 12, the ECU 9b decides whether the operating function of the imaging unit 9 is normal or not from the information acquired at Step S4 and in case where the function is normal, Step S7 is followed and otherwise, (at the time of malfunction or reduction in function), Step S13 of FIG. 13 is followed.

At Step S7, conformity in the number of lanes is decided. In other words, the number of lanes obtained by the imaging unit 9 (one on-vehicle camera is employed according to this embodiment of the invention) from the processing of image data on the forward road surface is compared with the number of lanes obtained from data in the navigation apparatus 8. In case where both coincide with each other, Step S8 is followed and otherwise, Step S12 of FIG. 13 is followed.

At Step S8, based on information from the navigation apparatus 8, the ECU 8b makes a decision on the following three conditions regarding the position of one's own vehicle.

(i) When one's own vehicle is in a node position near an intersection.

(ii) When one's own vehicle is in a node position near a curved road.

(iii) any position other than the two positions above.

Data on the latitude and longitude of the road, the number of links on a road crossing the traveling road is given to the node.

When (i) is decided at this step, Step S9 is followed; when (ii) is decided, Step S10 is followed; and when (iii) is decided, Step S13 of FIG. 13 is followed.

Based on information from the navigation apparatus 8 at Step S9, the ECU 8b decides whether one's own vehicle is at the intersection with a signal and Step S11 is then followed in case where the vehicle is at the intersection and otherwise, Step S13 of FIG. 13 is followed.

At Step S11, the ECUs 8b and 9b decide whether one's own vehicle is actually approaching the intersection by deciding whether the present position of the vehicle is within a predetermined range of precision with the intersection as a reference. In case where the vehicle is within the range, Step S13 of FIG. 13 is followed and otherwise, Step S12 of FIG. 13 is followed.

At Step S10, the ECU 9b obtains the direction of the curved road, a bent angle and so on from the result of image processing, collating the result with the information derived from the navigation apparatus 8 and decides whether the difference therebetween is within the predetermined range of precision. In case where the result is within the predetermined range, Step S13 of FIG. 13 and otherwise, Step S12 of FIG. 13 is followed.

Step S12 of FIG. 13 is reached when any difference is recognized between the information obtained from the result of imaging processing and the information derived from the navigation apparatus 8. Since the operating function of the imaging unit 9 is normal in this case, the ECU 8b decides that some problems have been developed about the precision and setting of the position of the navigation apparatus 8. Therefore, the information (data on the present position of one's own vehicle, the traveling road and the road) derived from the navigation apparatus 8 is modified according to the road data resulting from the image processing. For example, data on the traveling road itself from the navigation apparatus 8 is changed or the present position of one's own vehicle in the traveling road is reset. Even when the accuracy of the present position set by the navigation apparatus 8 is lower than the predetermined value, it may needless to say be acceptable to reset the present position and the traveling road and to modify the road data. Step S13 is followed after the nonconformity between both items of information is obviated through the modification like this.

At Step S13, when no difference exists between the information acquired from a result of image processing and the information derived from the navigation apparatus 8, the light distribution control of the headlamp is performed on the basis of the predetermined contents of control in accordance with the traveling road on which one's own vehicle is driven and the environmental condition. For example, the irradiation direction and range of the headlamp are controlled according to the road data, travel area data (as to expressways, bypasses, urban roads, mountainous roads, suburban roads and so forth) and weather data and so forth (by combining the control of driving the three lamps shown in FIG. 3 and the on-off and dimmering control over the lamps, the irradiation direction of each lamp is varied toward a direction fit for the road linearity and the irradiation range is changed by lighting each lamp at the intersection). Then the next Step S14 is followed and when the control is continued, Step S1 of FIG. 11 is followed again and otherwise, the processing is terminated.

As shown at Steps S9 and S11 of FIG. 12, the intersection with a signal is utilized at a point of time when the precision of the navigation apparatus 8 is checked and the reason for this is that as pedestrian crossings are drawn in places other than intersections of traveling roads, these places are prevented from being mistaken for the intersections.

A description will subsequently be given of a case where the steering of the vehicle, application of brakes and the irradiation from the headlamp are controlled as a result of extraction of the lane mark according to the image information from the on-vehicle camera 9a.

When the steering control is performed to follow the lane, lighting needs controlling so that the detected distance to the lane mark (the distance that allows the lane to be detected through the image processing) is maximized. In the headlamp shown in FIG. 3, their radiation direction is preferably controlled so as to maximize the detected distance to the lane mark in the direction of changing the route and in the turning direction by causing the optical axis of irradiation from the lamp 21 to be driven to the right and left in the horizontal direction. This is intended to effect the lane detection as far as possible and to precisely acquire various kinds of information necessary for the light distribution control.

In the lamp 19 of FIG. 3, further, the optical axis of irradiation is needed to be not raised higher than the horizontal line level, that is, the optical axis of irradiation is preferably driven vertically in a range within the vicinity of the horizontal line. Moreover, the lamp 20 is turned on or the lamp 21B capable of emission of near infrared light is turned on when the quantity of irradiation within a short distance range is needed.

Figure 14:
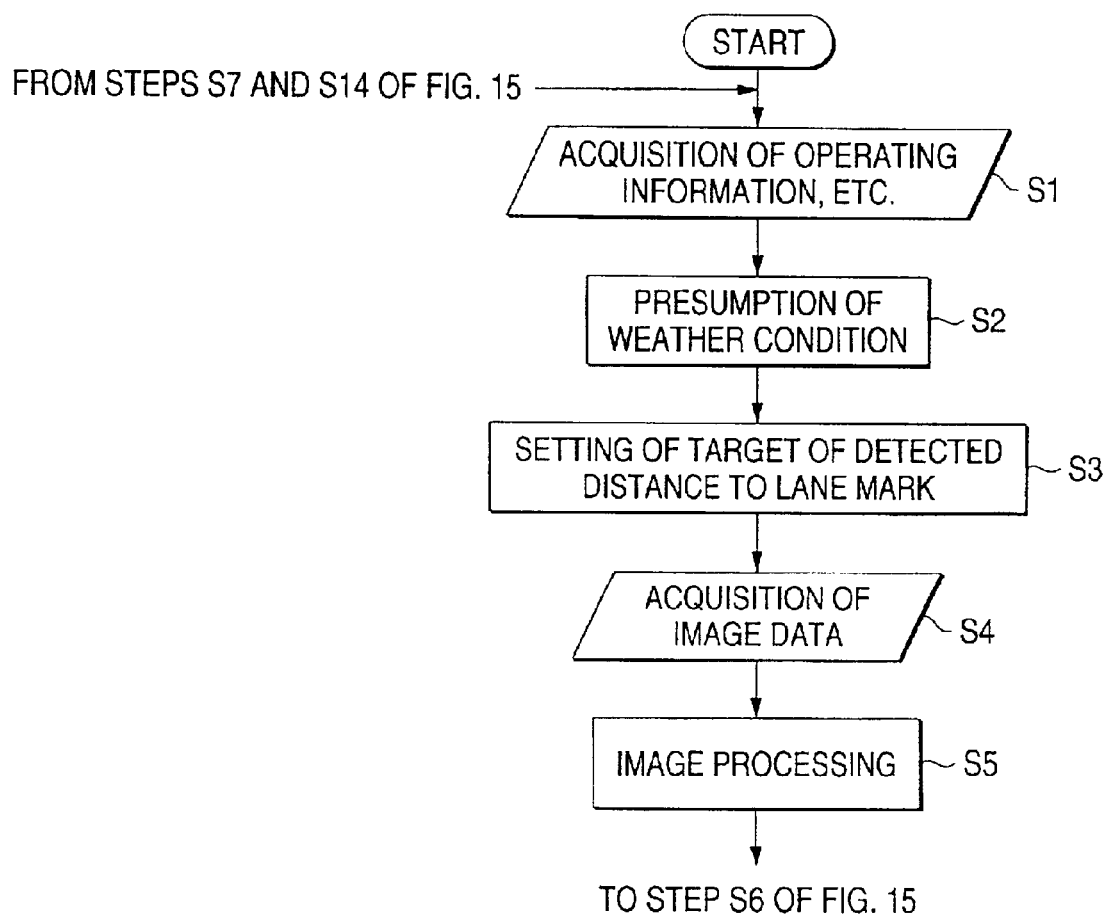
FIG. 14 is a flowchart showing exemplary irradiation control for increasing a detection distance to a lane mark together with FIG. 15, this figure showing a first half processing portion.
Figure 15:
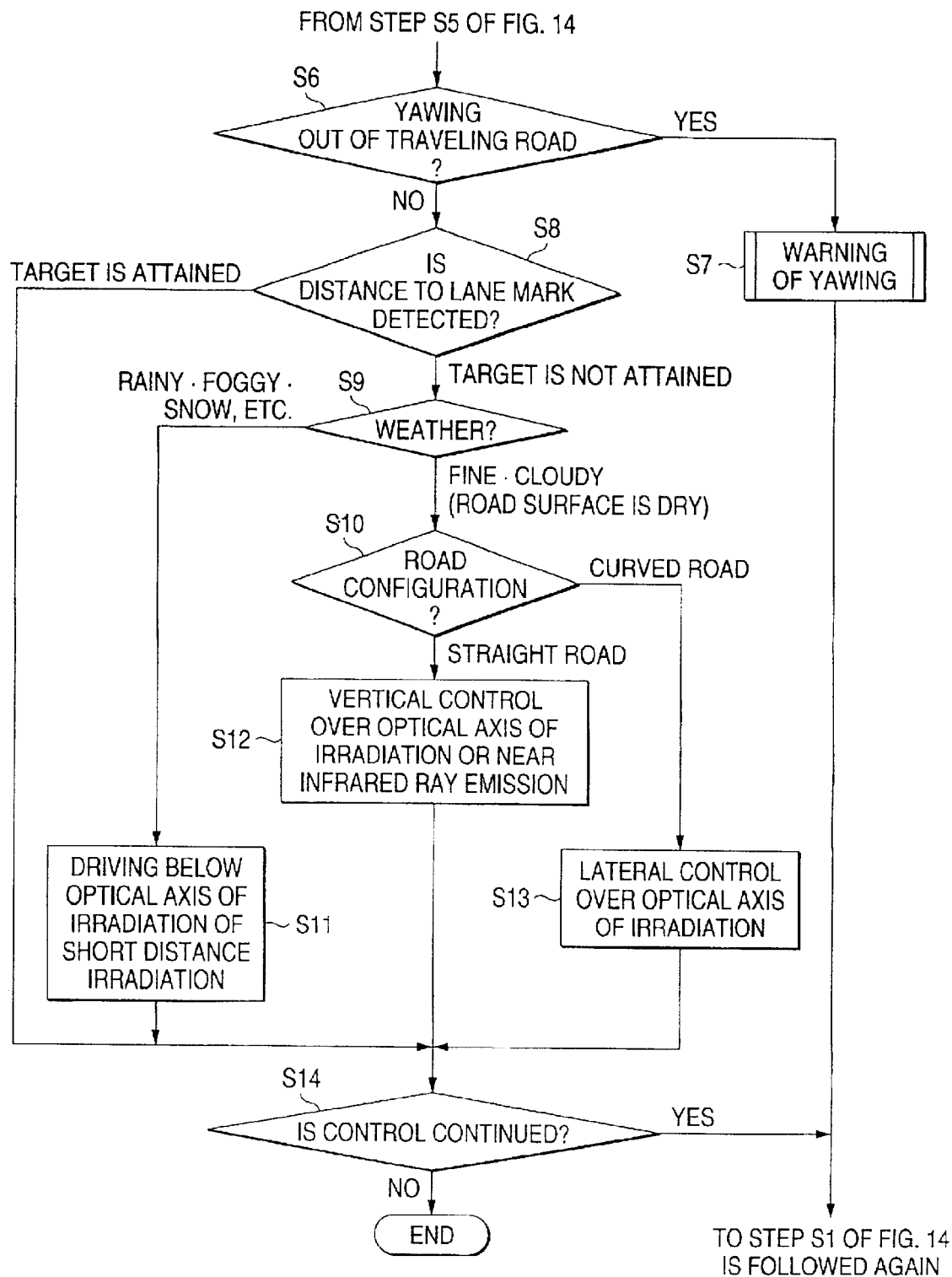
FIG. 15 is a flowchart showing a second half processing portion.

FIGS. 14 and 15 are flowcharts for explaining a control processing procedure.

At Step S1 of FIG. 14, first, information concerning driving operation and travel environment. In other words, the ECUs 14 and 15 acquire the information detected from the steering angle sensor, the vehicle speed sensor and the illumination sensor, the wiper operating information, the present time and so forth and process these kinds of information.

At Step S2, further, based on the information concerning the wiper operating condition, the intensity of illumination and the like, the ECU 15 performs the process of presuming the weather condition (distinguishing among fine, cloudy, rainy conditions and size of the rainfall).

Then Step S3 is followed and a target value regarding the detection of the distance to the lane mark is set in conformity with the vehicle speed and the weather condition.

The ECU 9b performs the image processing at Step S5 after taking in the image data from the imaging unit 9 at Step 54. Thus, data is obtained on the luminance contrast between the road surface and the lane mark, the maximum detected distance to the lane mark, the result of recognizing the road linearity (bent direction, curvature and the like), the road surface condition (dry, wet and the like) and the positions of one's own vehicle and the preceding vehicle in the vehicle lane and so forth.

At Step S6 of FIG. 15, the ECU 14 decides whether one's own vehicle yaws out of the traveling road according to the information on the detected lane obtained as a result of the image processing. At this time, the data derived from the steering angle and vehicle speed sensors, the curvature of the road linearity obtained by the image processing ECU 9b and data on the position of one's own vehicle in the vehicle lane are used as data for use in making decisions.

Then Step S7 is followed at the time when yawing is decided and Step S1 of FIG. 14 is followed again after the driver is warned of the yawing. In case where the vehicle does not yaw out of the traveling road, Step S3 is followed and the ECU 9b decides whether the detected distance to the lane mark has attained the target value.

Although Step S14 is then followed when the target is attained, Step S9 is followed when the garget is not attained and a decision is made on the weather by combining various items of information together including the image contrast.

In other words, Step S10 is followed in case where fine and cloudy weather is presumed by the ECU 15 (i.e., a condition in which the road surface is dry) and Step S11 is followed in case where any other condition (including rainy, foggy, snowy conditions) is presumed.

At Step S10, a decision is made on whether the road is a straight or a curved road according to the image processing data and in case where it is a straight road, Step S12 is followed and otherwise, Step S13 is followed.

At Step S12, the optical axis is controlled in the vertical direction of the lamp. In other words, in the headlamp of FIG. 3, the optical axis of irradiation from the lamp 19 is regulated by the ECU 16 so that the optical axis is not raised too much, and the irradiation direction is controlled by calculating the quantity of driving the optical axis in a range on the horizontal plane or lower. For example, the optical axis of irradiation is directed upward and raised up to the vicinity of the horizontal line to exert control so that a far visual field is sufficiently secured by increasing the forward irradiation distance. Moreover, it is effective to turn on the lamp (see 21B of FIG. 6) capable of emitting a near infrared ray.

At Step S13, the optical axis of the lamp is controlled in the lateral direction. In other words, the ECU 16 in the headlamp of FIG. 3 calculates the driving quantity of the optical axis so as to vary the optical axis of irradiation of the lamp 21 in the lateral direction in accordance with the linearity of the curved road and controls the irradiation direction. Thus, the visual field in the direction in which the vehicle is about to turn is secured by irradiation the lane mark on the side in the direction of the curved road in the lane of one's own vehicle.

At Step S11, the road surface on this side and ahead of one's own vehicle is irradiated to illuminate the surface by controlling the driving of the optical axis of the lamp (e.g., the lamp used to emit the low beam) in order to direct the optical axis downward or turning on the lamp 20 of FIG. 3 to secure the visual field in the short distance range by irradiating the lane mark near the vehicle with a sufficient quantity of light. With these kinds of control, an influence resulting from an optical film phenomenon in the fog, the dampness of the road surface and a surface reflection due to flooding is made reducible.

Control at Steps S11 to S13 is effective in increasing the detected distance in case where the maximum detected distance to the lane mark does not reach the target value. In other words, as the distance at which an object for visual recognition including the lane mark becomes unsatisfactory in this condition, the irradiation control above is preferably performed so as to secure a detected distance sufficient enough to meet the road surface and weather conditions.

After these steps, Step S14 is followed wherein a decision is made on whether the control is continued and in case where the control is continued, Step S1 is followed again and the control is terminated at the time when the apparatus is stopped.

As set forth above, important is attached to properly choosing the information acquired from the navigation apparatus or what is acquired through the image processing depending on the travel condition, precisely easing the conflict between both types of information and positively utilizing various kinds of information concerning the ambient environment, driving operation and the like (in order to prevent a harmful influence originating from improper lamp irradiation as much as possible without overestimating one kind of data).

Although the process of making the decision in the processing in each flowchart described above is to be completed at one try for the convenience of explanation, control is actually performed such that a confirming process is carried out to prevent wrong information from being generated by performing the processing several times or for a predetermined time and to acquire reliable data.

As is obvious from the description given above, according to the invention, by comparing and collating the information derived from the map information acquiring means with the information detected by the environmental condition detection means, the priority is given to more reliable one of both kinds of the information, so that the light distribution control over the lighting device can be performed or that the light distribution control over the lighting device can be performed according to the modified information complemented with the difference between both kinds of information. Consequently, a harmful influence originating from the irradiation from the headlamp according to the improper information is prevented and forward irradiation light on the traveling road of the vehicle is satisfactorily secured by using highly reliable detected information with travel safety being enhanced.

According to the invention, the light distribution control corresponding to the lane on which one's own vehicle is actually being driven is made realizable by switching the information derived from the map information acquiring means and the information detected by the environmental condition detection means.

According to the invention, the irradiation performance is prevented from being lowered by performing the light distribution control according to the information from the map information acquiring means as it is highly probable that problems develop from the information acquired from the result of image processing when the lane detection capability of the imaging unit is reduced.

According to the invention, the irradiation control over the lighting device can be effected without being affected by a harmful influence (such as reduction in the lane detection capability) originating from the ambient environment condition including the optical film phenomenon and the road condition (such as the surface reflection due to dampness and flooding) by exerting the light distribution control over the headlamp according to the information derived from the map information acquiring means when the weather is worsened.

What is claimed is:

1. A vehicle headlamp apparatus comprising:
   map information acquiring means for acquiring positional information on a vehicle on a map and environmental information;
   environmental condition detection means for detecting an environmental condition relating to a road on which the vehicle is traveling according to image information or information acquired from radar; and
   light distribution control means for varying light distribution of a headlamp attached to a vehicle in accordance with variation in a travel condition of the vehicle and the environmental condition,
   wherein said light distribution control means performs light distribution control for the headlamp according to one of information adopted information judged by the light distribution control means to be the more reliable as between information from said map information acquiring means and the information detected by said environmental condition detection means.

2. A vehicle headlamp apparatus as claimed in claim 1, wherein a lane with respect to a road on which the vehicle is being driven is detected and the detected result is judged good or bad;
   light distribution control over the headlamp is performed by switching the information detected by said environmental condition detection means and the information derived from said map information acquiring means according to the result thus judged.

3. A vehicle headlamp apparatus as claimed in claim 2, wherein when the result of lane detection is judged to be good, priority is given to the information detected by said environmental condition detection means.

4. A vehicle headlamp apparatus as claimed in claim 1, wherein when the first information acquired by said map information acquiring means is different from the second information acquired by said environmental condition detection means, the first information is modified according to the second information and the light distribution control over the headlamp is performed by using the modified information.

5. A vehicle headlamp apparatus as claimed in claim 1, further comprising steering information acquiring for acquiring information to supply said light distribution control means.

6. A vehicle headlamp apparatus as claimed in claim 1, wherein said light distribution control means controls an optical axis of the head lamp in a vertical direction to vary the light distribution thereof.

7. A vehicle headlamp apparatus as claimed in claim 1, wherein said light distribution control means controls an infrared lamp that emits a near infrared ray.

8. A vehicle headlamp apparatus as claimed in claim 1, wherein said light distribution control means controls an optical axis of the head lamp in a lateral direction to vary the light distribution thereof.

9. A vehicle headlamp apparatus as claimed in claim 1, wherein said light distribution control means controls an optical axis of the head lamp to direct downward so as to illuminate an area ahead of the vehicle.

10. A vehicle headlamp apparatus as claimed in claim 1, wherein said light distribution control means controls to irradiate a lane mark near the vehicle.

11. A vehicle headlamp apparatus comprising:
    map information acquiring means for acquiring positional information on a vehicle on a map and environmental information;

environmental condition detection means for detecting an environmental condition relating to a road on which the vehicle is traveling according to image information or information acquired from radar; and light distribution control means for varying light distribution of a headlamp attached to a vehicle in accordance with variation in a travel condition of the vehicle and the environmental condition, wherein said light distribution control means performs light distribution control for the headlamp according to information judged by the light distribution control means to be the more reliable as between information from said map information acquiring means and the information detected by said environmental condition detection means, and wherein said environmental condition detection means comprises an imaging unit for forming an image ahead of the vehicle; when detection capability of said imaging unit is low, light distribution control means performs light distribution control over the headlamp according to the information derived from said map information acquiring means.

12. A vehicle headlamp apparatus comprising:

map information acquiring means for acquiring positional information on a vehicle on a map and environmental information;

environmental condition detection means for detecting an environmental condition relating to a road on which the vehicle is traveling according to image information or information acquired from radar, wherein a lane with respect to a road on which the vehicle is being driven is detected and the detected result is judged good or bad, and wherein said environmental condition detection means comprises an imaging unit for forming an image ahead of the vehicle; and light distribution control means for varying light distribution of a headlamp attached to a vehicle in accordance with variation in a travel condition of the vehicle and the environmental condition, wherein said light distribution control means performs light distribution control for the headlamp according to information judged by the light distribution control means to be the more reliable as between information from said map information acquiring means and the information detected by said environmental condition detection means, and lift distribution control over the headlamp is performed by switching the information detected by said environmental condition detection means and the information derived from said map information acquiring means according to whether the detected result is judged good or bad, and when lanemark detection capability of said imaging unit is low, the light distribution control means performs light distribution control over the headlamp according to the information derived from said map information acquiring means.

13. A vehicle headlamp apparatus comprising:

map information acquiring means for acquiring position information on a vehicle on a map and environmental information;

environmental condition detection means for detecting an environmental condition relation to a road on which the vehicle is traveling according to image information or information acquired from radar; and light distribution control means for varying light distribution of a headlamp attached to a vehicle in accordance with variation in a travel condition of the vehicle and the environmental condition, wherein said light distribution control means performs light distribution control for the headlamp according to information judged by the light distribution control means to be the more reliable as between information from said map information acquiring means and the information detected by said environmental condition detection means, and wherein when worsening of weather is detected, said light distribution control means performs light distribution control for the headlamp according to the information derived from said map information acquiring means.

* * * * *